(12) United States Patent
Cho et al.

(10) Patent No.: US 10,587,742 B2
(45) Date of Patent: Mar. 10, 2020

(54) MOBILE TERMINAL AND CONTROL METHOD THEREFOR

(71) Applicant: LG ELECTRONICS INC., Seoul (KR)

(72) Inventors: Junho Cho, Seoul (KR); Jungkyu Choi, Seoul (KR); Youngwoo Kim, Seoul (KR); Huran Choi, Seoul (KR); Daeyeon Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 184 days.

(21) Appl. No.: 15/569,733

(22) PCT Filed: Sep. 8, 2015

(86) PCT No.: PCT/KR2015/009458
§ 371 (c)(1),
(2) Date: Oct. 26, 2017

(87) PCT Pub. No.: WO2016/175396
PCT Pub. Date: Nov. 3, 2016

(65) Prior Publication Data
US 2018/0131802 A1 May 10, 2018

Related U.S. Application Data

(60) Provisional application No. 62/153,377, filed on Apr. 27, 2015.

(30) Foreign Application Priority Data

May 12, 2015 (KR) .................... 10-2015-0066235

(51) Int. Cl.
*G06F 1/16* (2006.01)
*H04M 1/725* (2006.01)
(Continued)

(52) U.S. Cl.
CPC ...... *H04M 1/72522* (2013.01); *G06F 1/1626* (2013.01); *G06F 3/04883* (2013.01);
(Continued)

(58) Field of Classification Search
None
See application file for complete search history.

(56) References Cited

U.S. PATENT DOCUMENTS 6,157,844 A * 12/2000 Doran .................... H04M 1/271
455/518
6,799,052 B2 * 9/2004 Agness ................ H04B 1/3805
455/456.4
(Continued)

FOREIGN PATENT DOCUMENTS

CN 103197756 7/2013
JP 2012068274 4/2012
(Continued)

OTHER PUBLICATIONS

PCT International Application No. PCT/KR2015/009458, International Search Report dated Jan. 27, 2016, 2 pages.
(Continued)

*Primary Examiner* — Neeraj Sharma
(74) *Attorney, Agent, or Firm* — Lee, Hong, Degerman, Kang & Waimey

(57) ABSTRACT

Provided are a mobile terminal and a control method therefor. The mobile terminal includes: a touchscreen disposed on one side of a main body of the terminal; a push key mounted on the main body to receive a push input; and a controller that displays virtual keys associated with the settings or control of the terminal on the touchscreen when the push key is pushed, and executes functions associated with a speech recognition mode when a set period of time elapses without at least one touch input on the virtual keys being sensed.

16 Claims, 27 Drawing Sheets

(51) Int. Cl.
  *G06F 3/16* (2006.01)
  *G06F 3/0488* (2013.01)
(52) U.S. Cl.
  CPC .......... *G06F 3/04886* (2013.01); *G06F 3/167* (2013.01); *H04M 1/72583* (2013.01); *H04M 2250/22* (2013.01); *H04M 2250/74* (2013.01)

(56) References Cited

U.S. PATENT DOCUMENTS

| | | | | |
|---|---|---|---|---|
| 7,761,110 | B2* | 7/2010 | Chotai | H04W 76/45 455/519 |
| 8,385,963 | B2* | 2/2013 | Aoike | H04B 1/3833 455/517 |
| 8,565,749 | B2* | 10/2013 | Satake | H04W 4/08 455/422.1 |
| 8,577,404 | B2* | 11/2013 | Brewer | H04W 4/10 455/518 |
| 2002/0082832 | A1 | 6/2002 | Nagashima | |
| 2005/0288063 | A1 | 12/2005 | Seo et al. | |
| 2008/0240377 | A1 | 10/2008 | Lee | |
| 2009/0248419 | A1* | 10/2009 | Spaulding | G10L 15/22 704/275 |
| 2014/0270258 | A1* | 9/2014 | Wang | G06F 3/167 381/110 |
| 2014/0278435 | A1* | 9/2014 | Ganong, III | G10L 15/22 704/275 |
| 2015/0269835 | A1* | 9/2015 | Benoit | G08B 25/016 340/539.13 |
| 2015/0340025 | A1* | 11/2015 | Shima | G06F 21/32 704/246 |
| 2016/0034145 | A1* | 2/2016 | Lee | G06F 3/04817 715/765 |

FOREIGN PATENT DOCUMENTS

| | | |
|---|---|---|
| JP | 2013179379 | 9/2013 |
| KR | 10-0600966 | 7/2006 |
| KR | 100600966 | 7/2006 |
| KR | 10-0800689 | 2/2008 |

OTHER PUBLICATIONS

Korean Intellectual Property Office Application No. 10-2015-0066235, Office Action dated Feb. 24, 2017, 4 pages.
Korean Intellectual Property Office Application No. 10-2015-0066235, Office Action dated Aug. 28, 2017, 4 pages.
European Patent Office Application Serial No. 15890837.6, Search Report dated Dec. 12, 2018, 6 pages.

* cited by examiner

[Fig. 1a]
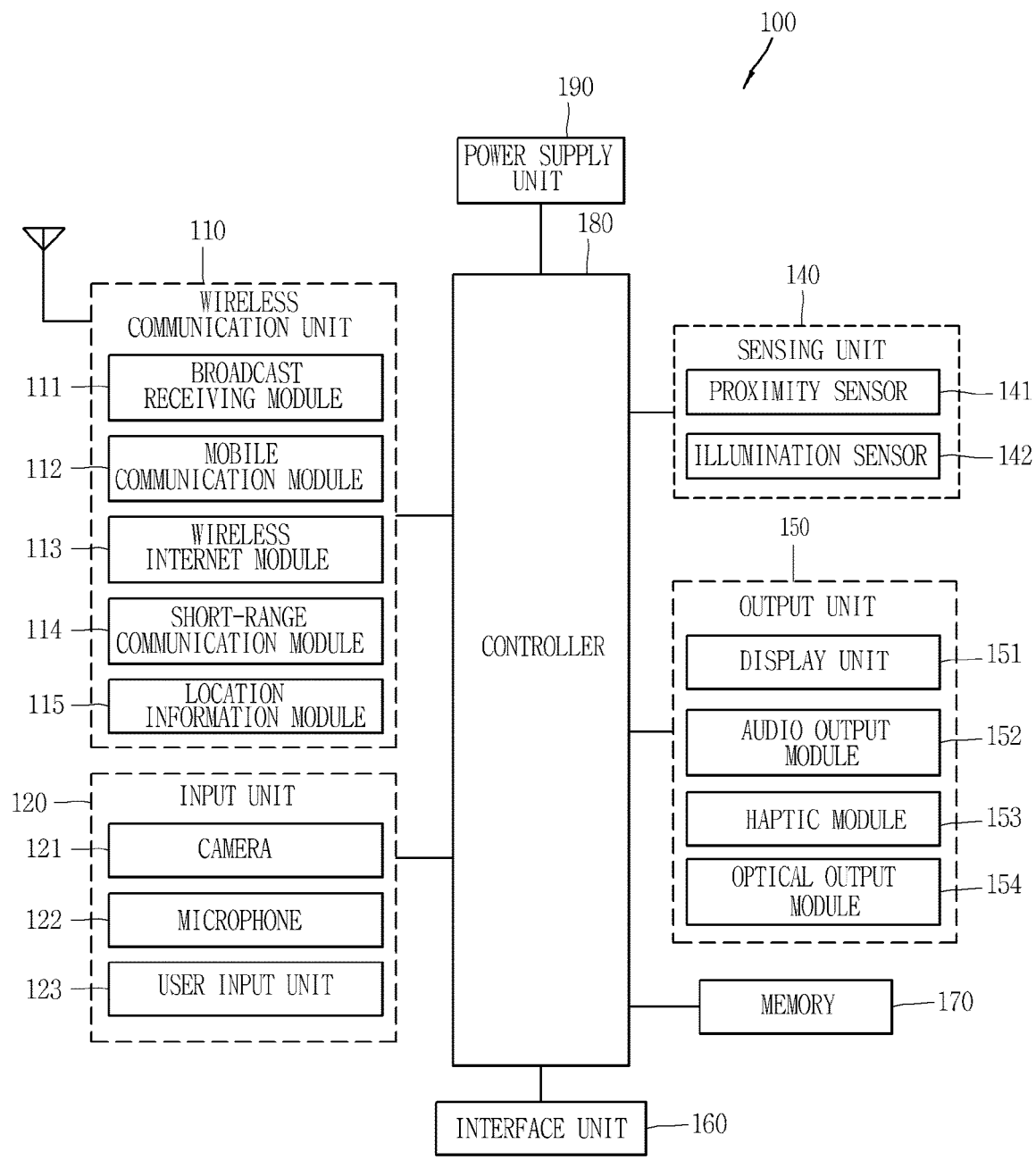

[Fig. 1b]
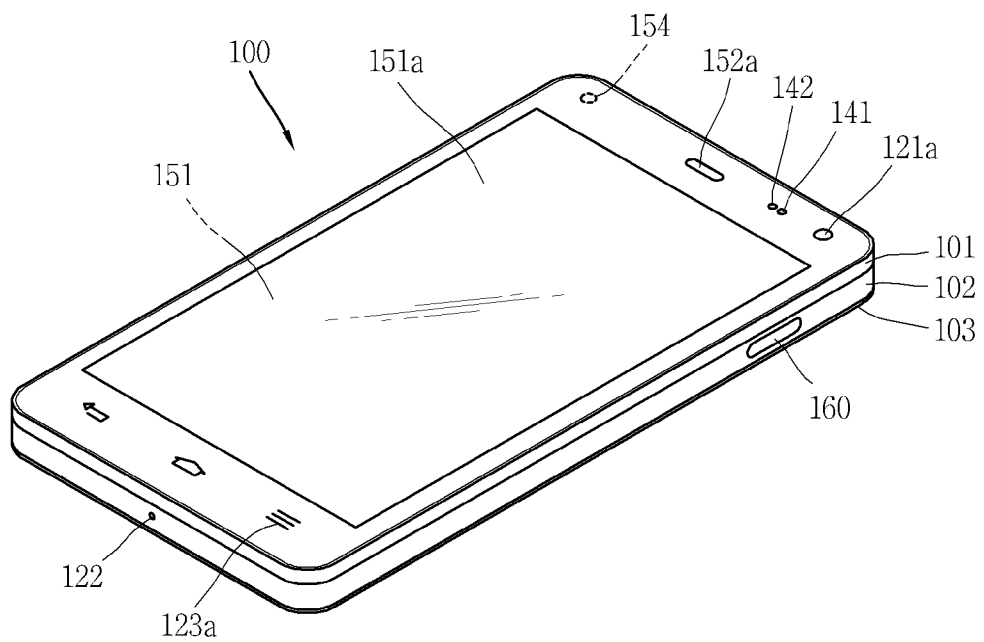
[Fig. 1c]
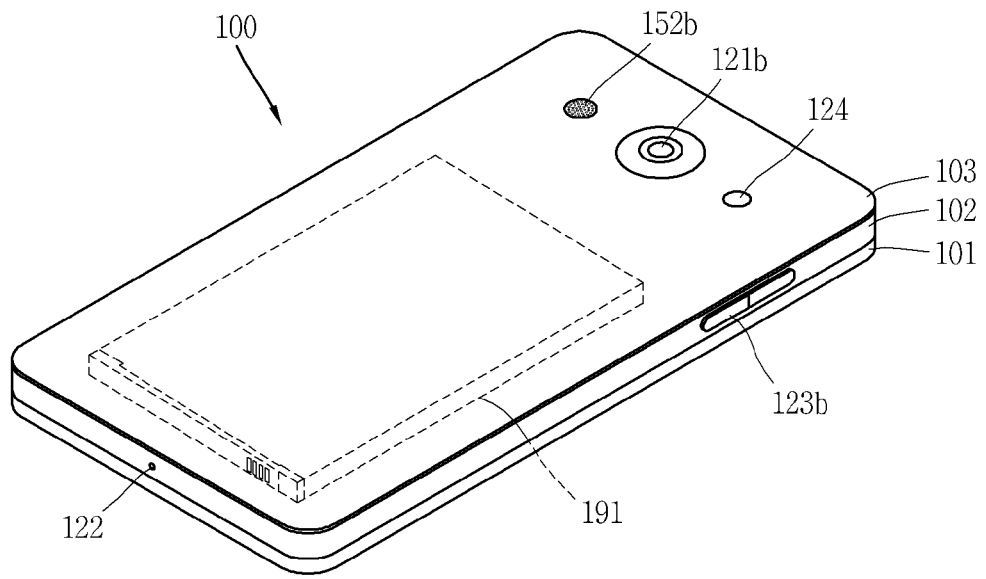

[Fig. 2a]
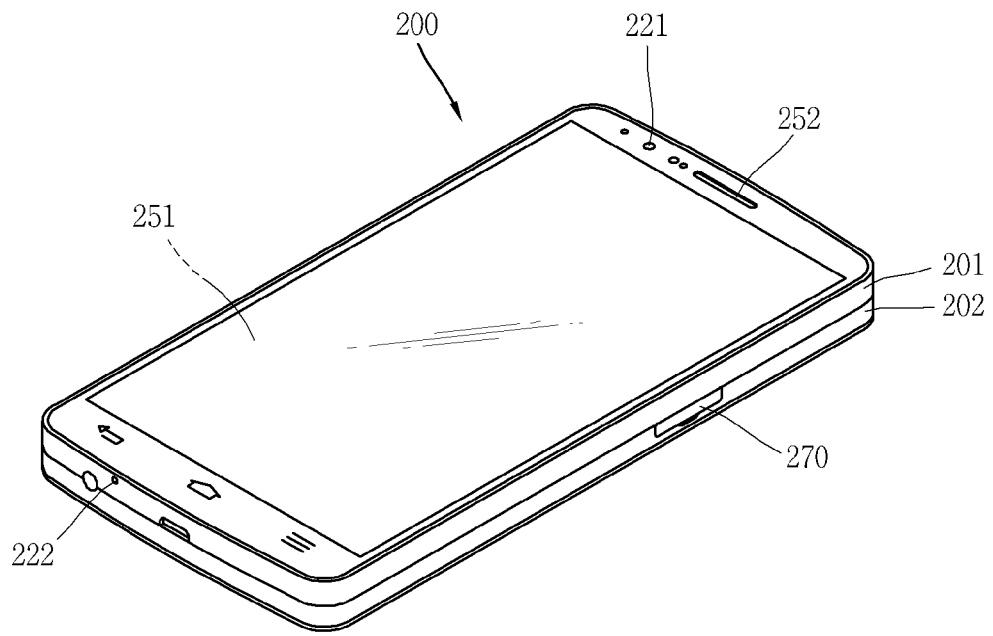
[Fig. 2b]
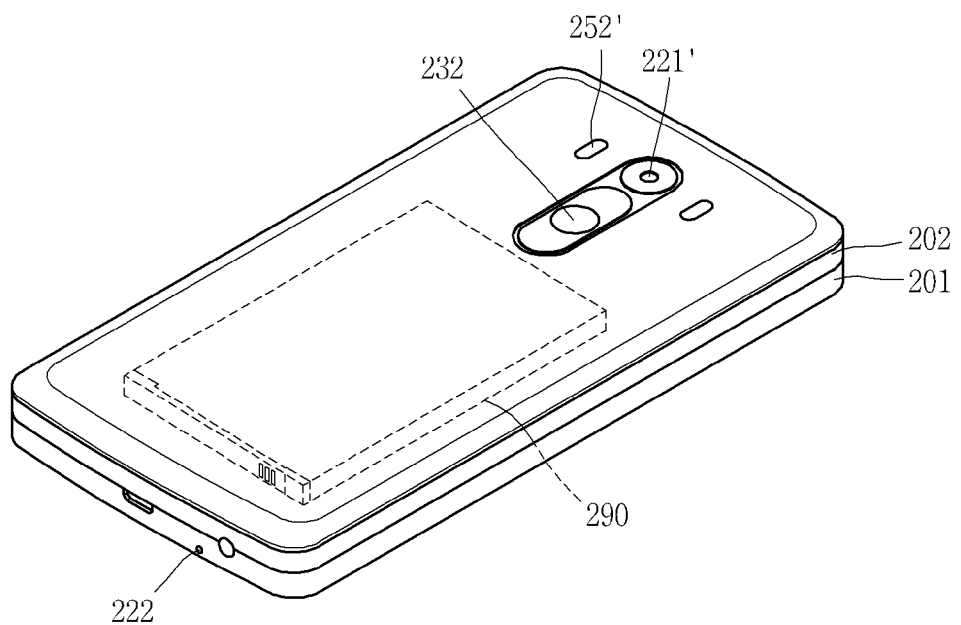

[Fig. 3]
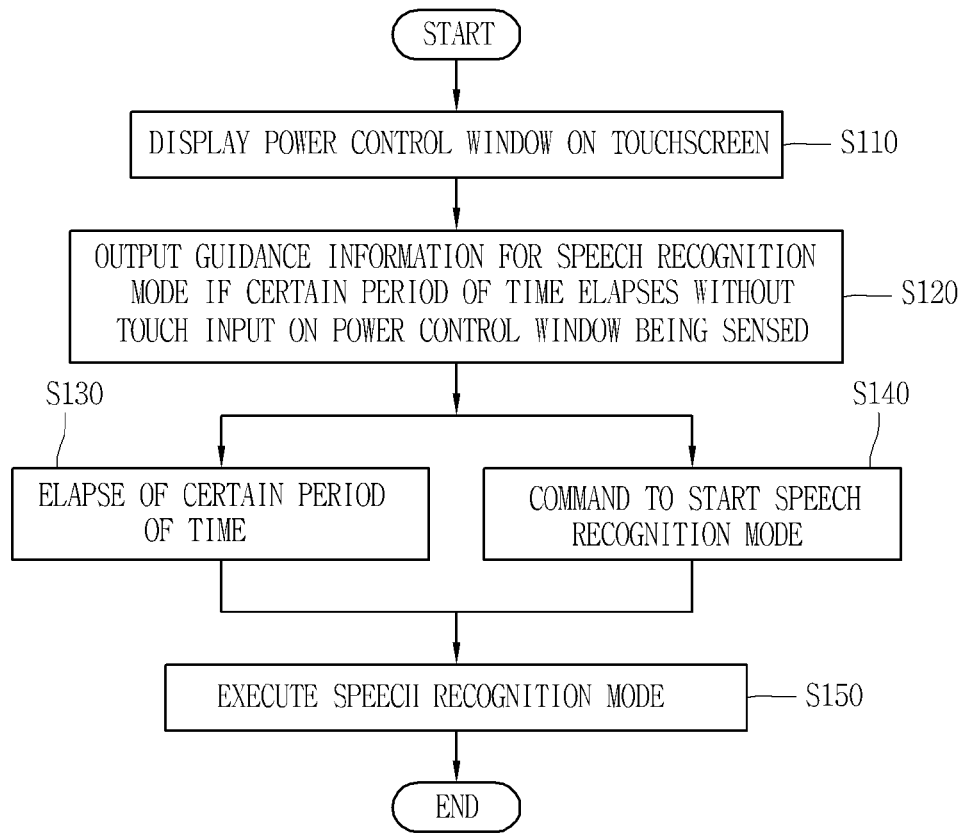
[Fig. 4a]
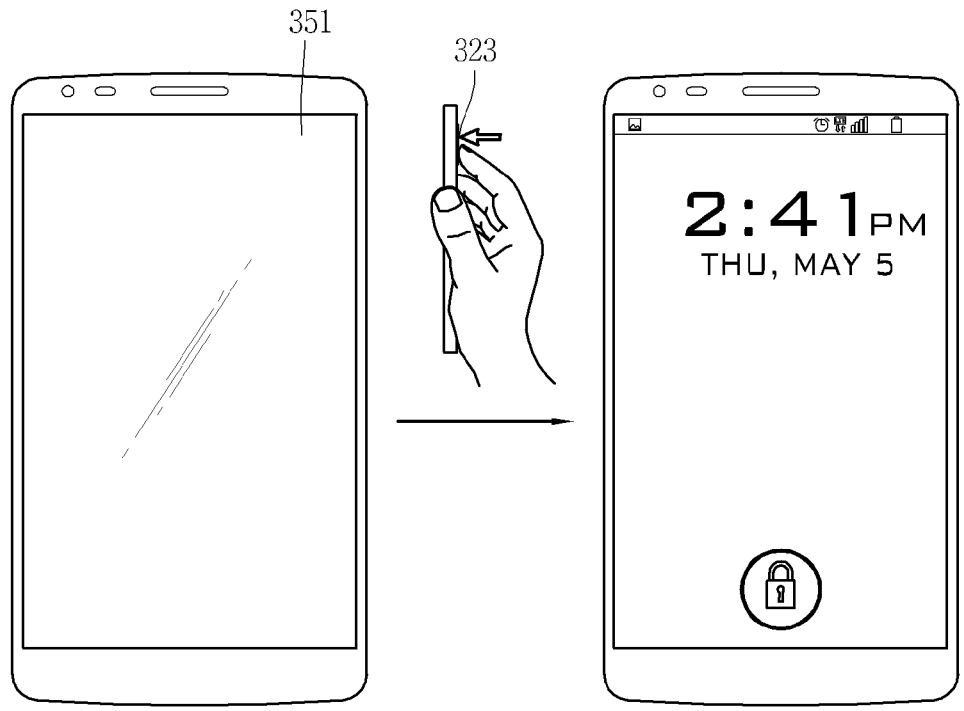

[Fig. 4b]
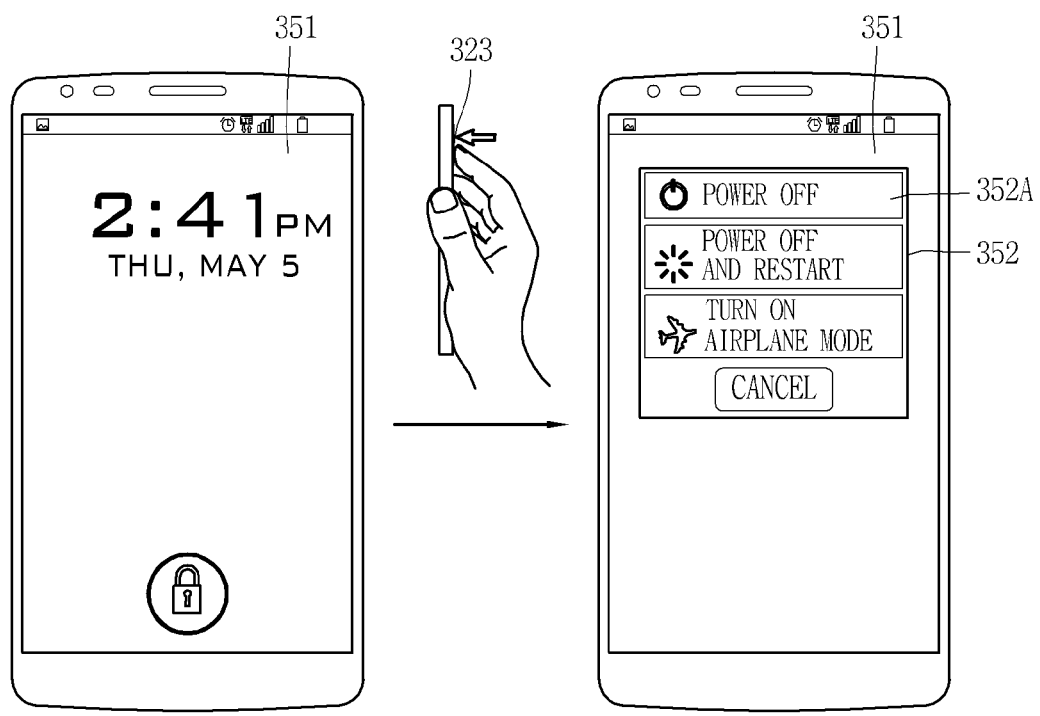

[Fig. 4c]
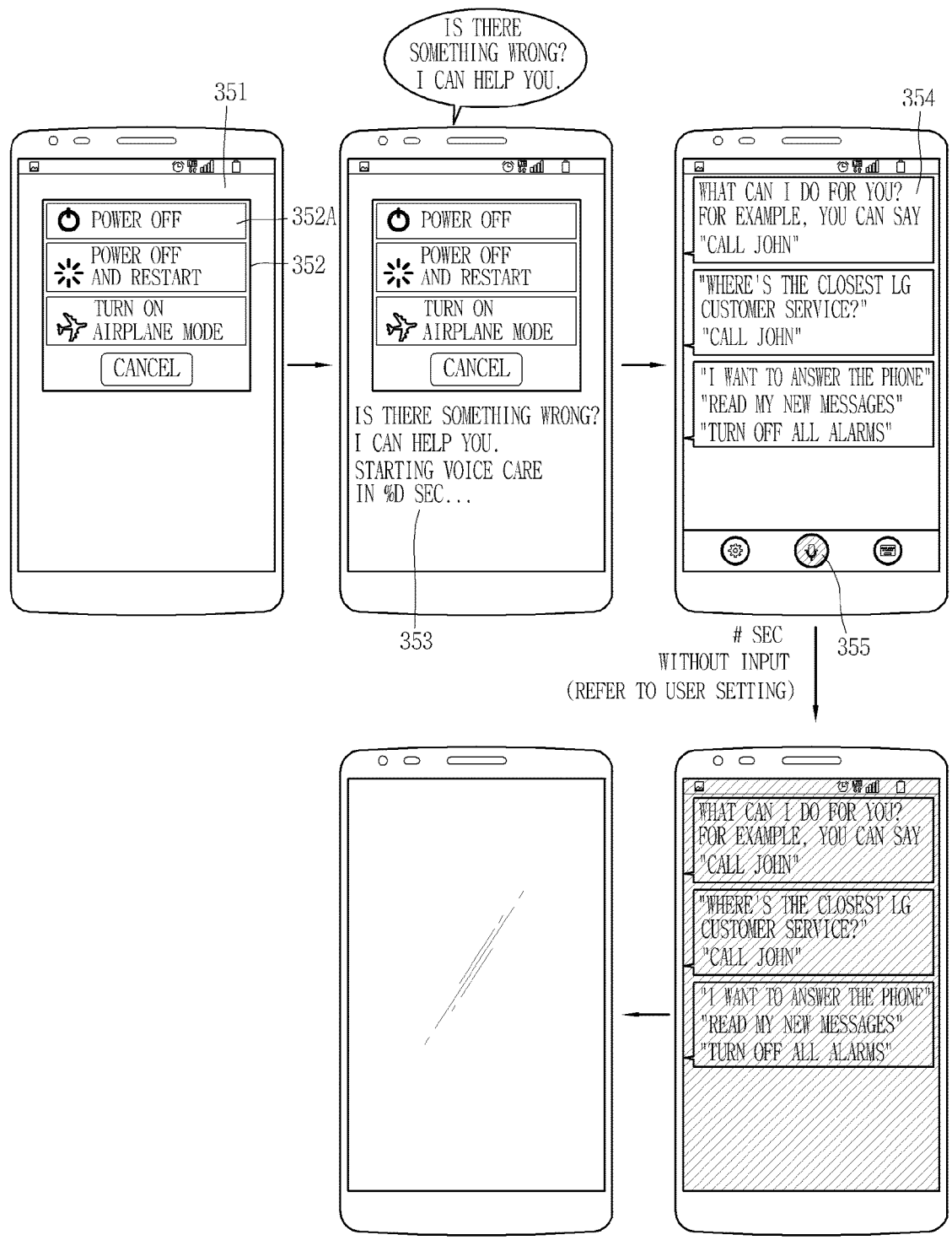

[Fig. 5a]
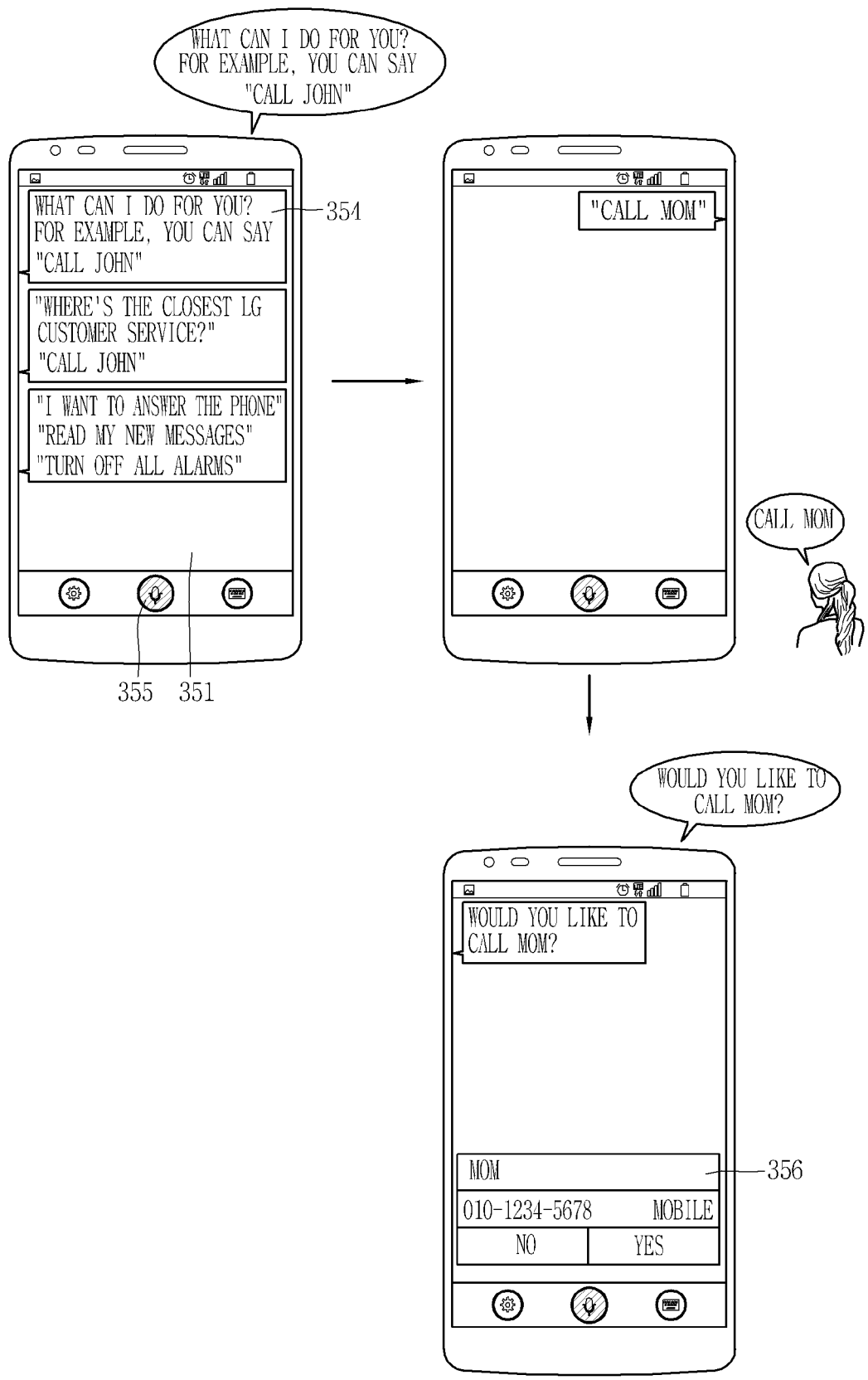

[Fig. 5b]
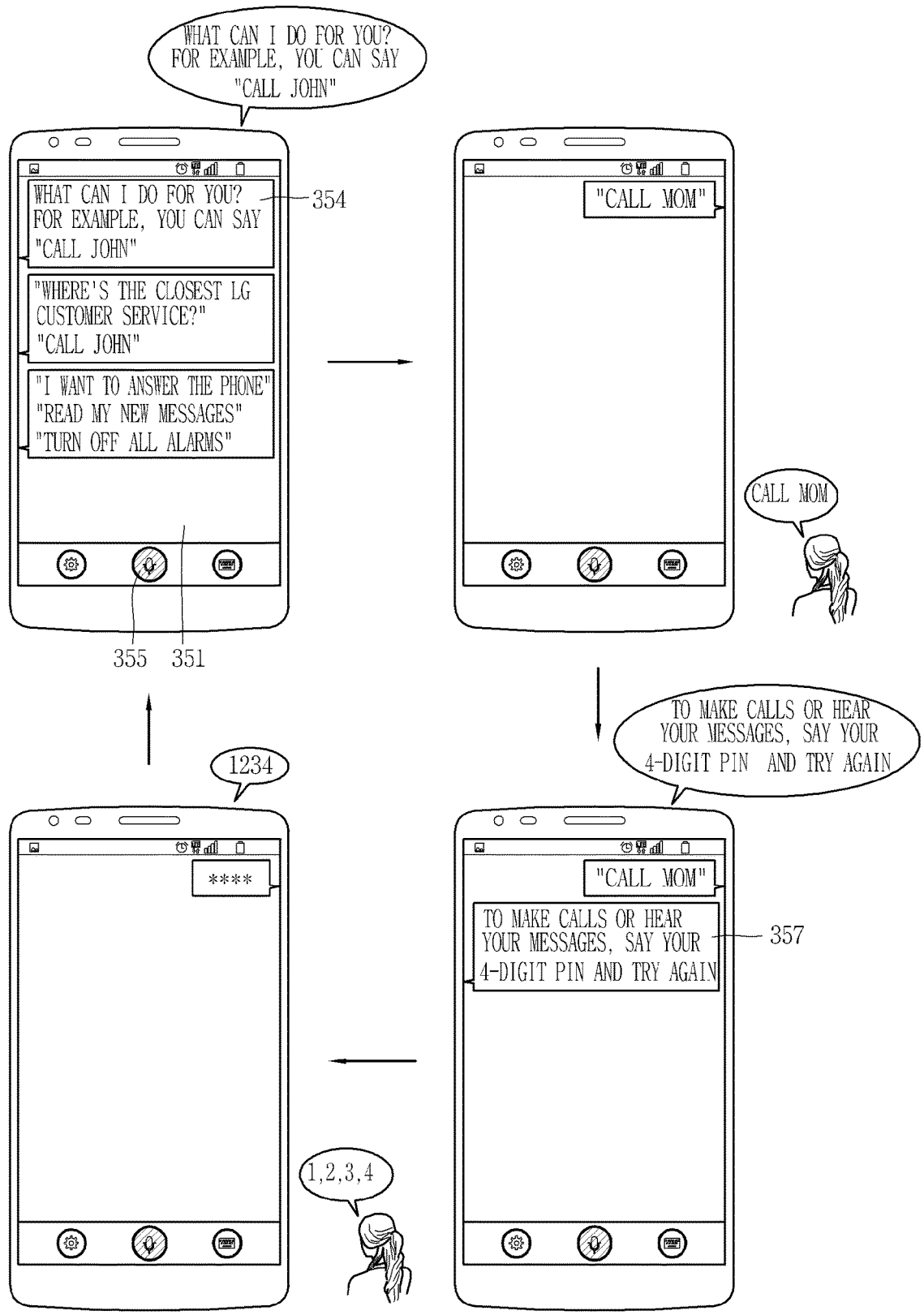

[Fig. 5c]
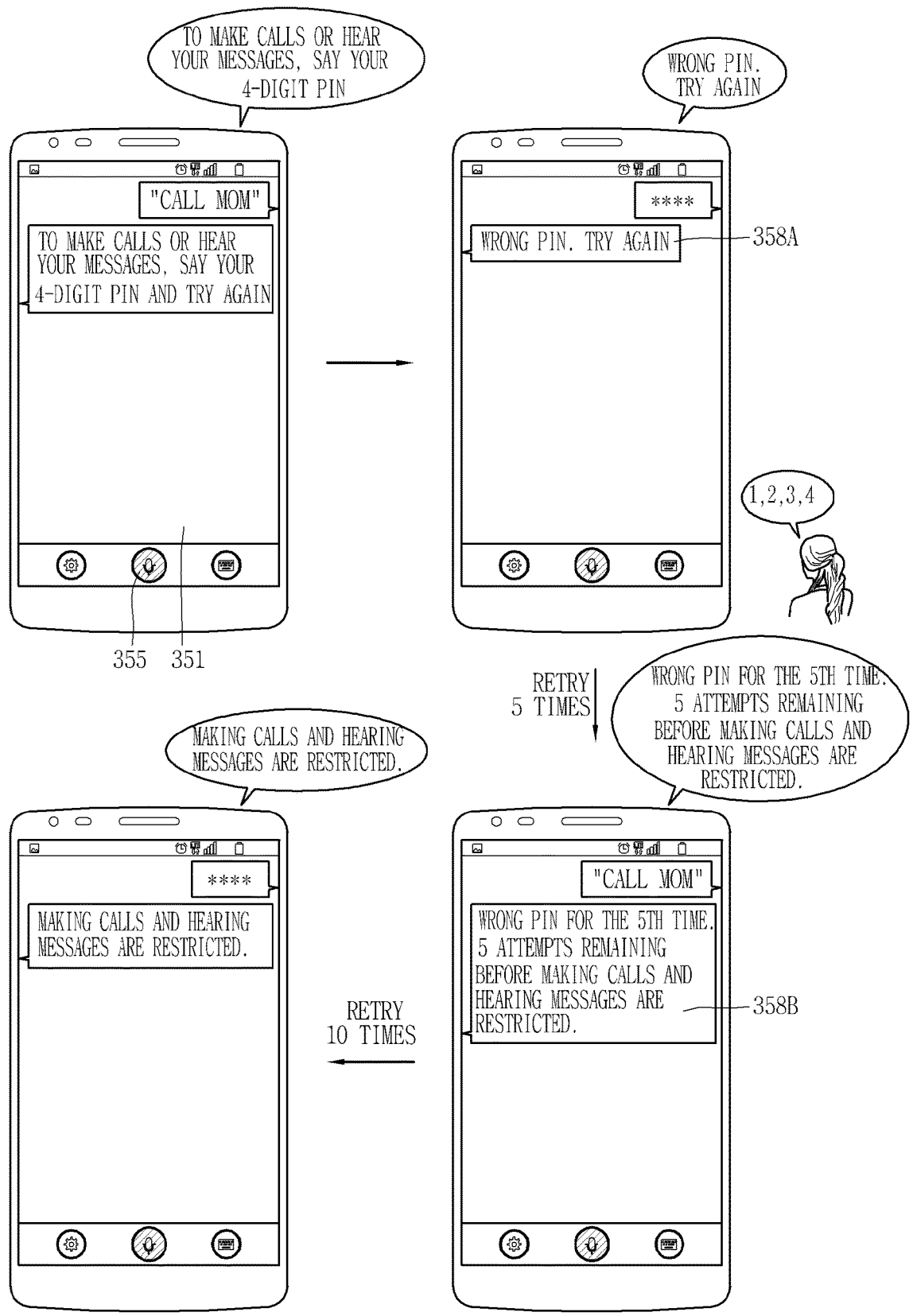

[Fig. 5d]
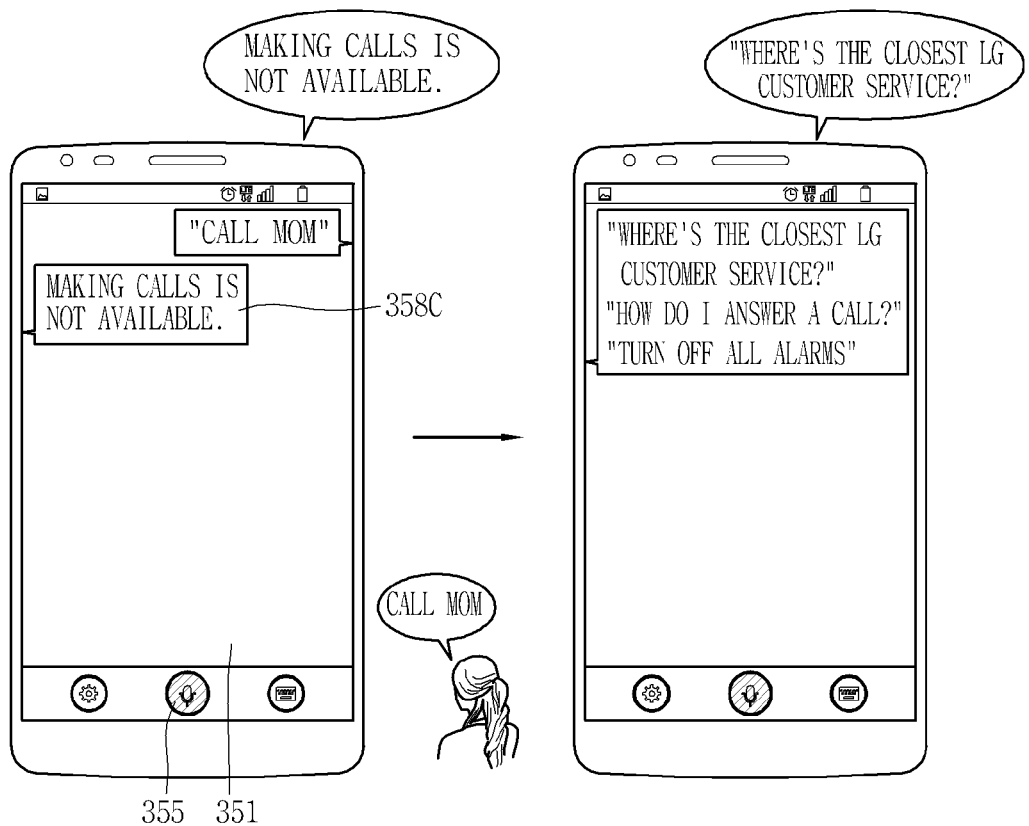

[Fig. 6]
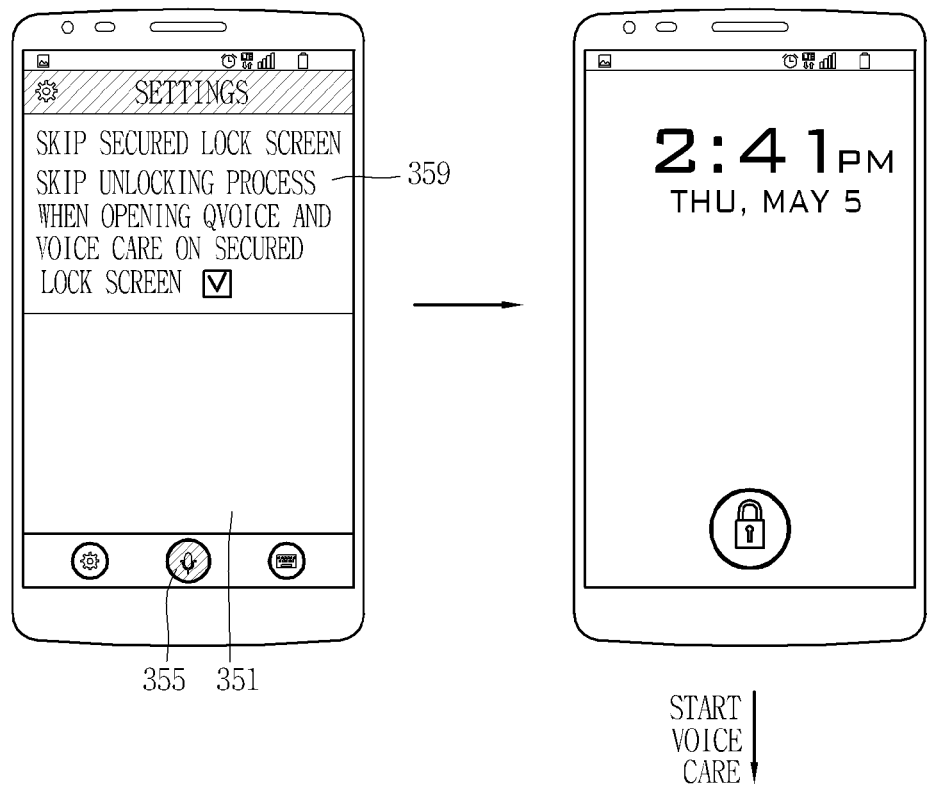
START VOICE CARE
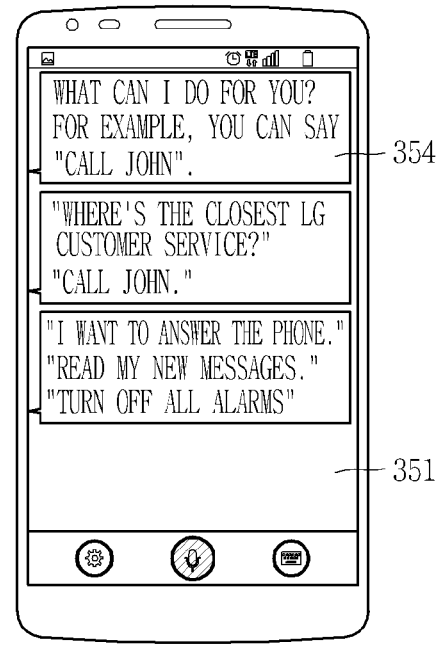

[Fig. 7a]
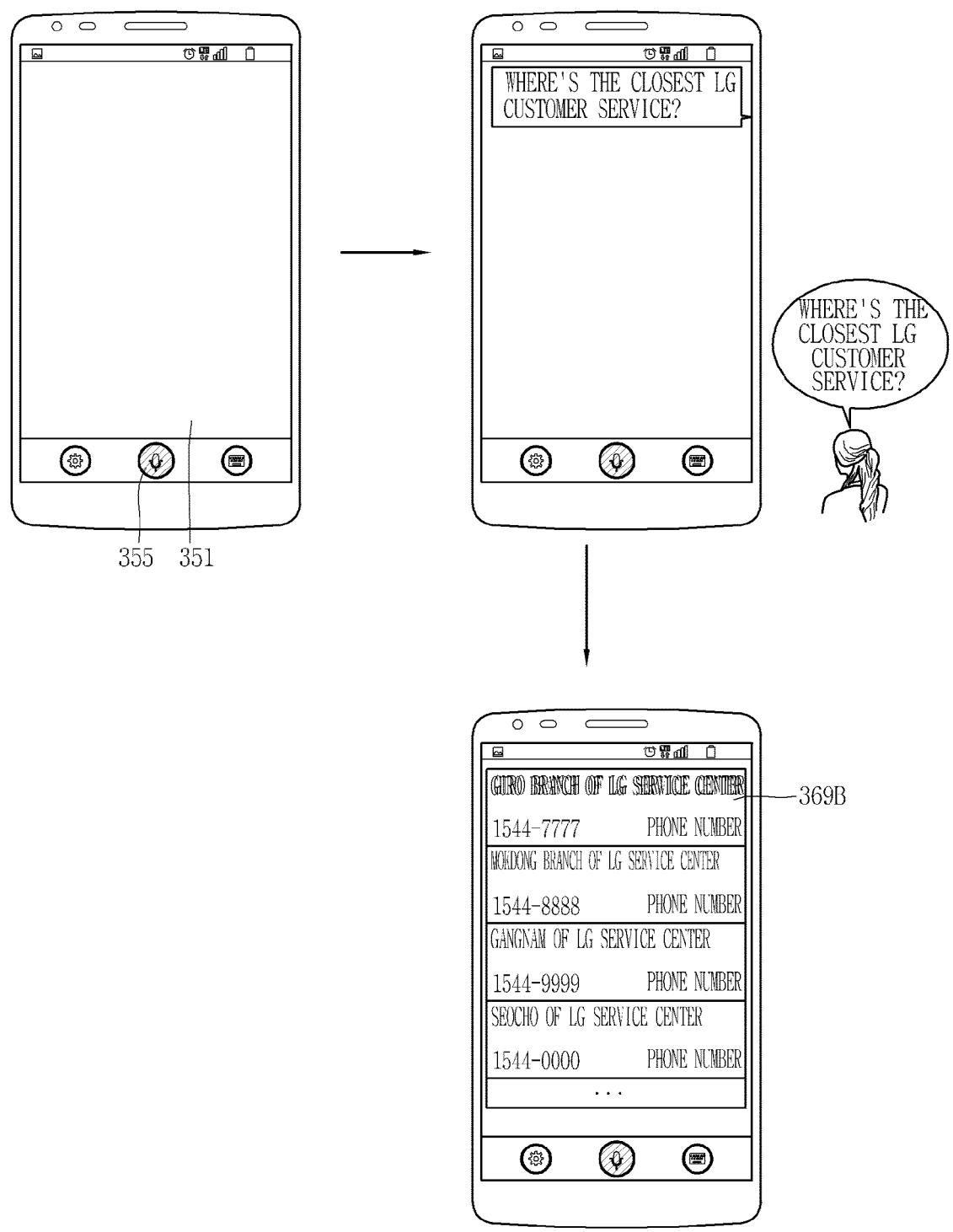

[Fig. 7b]
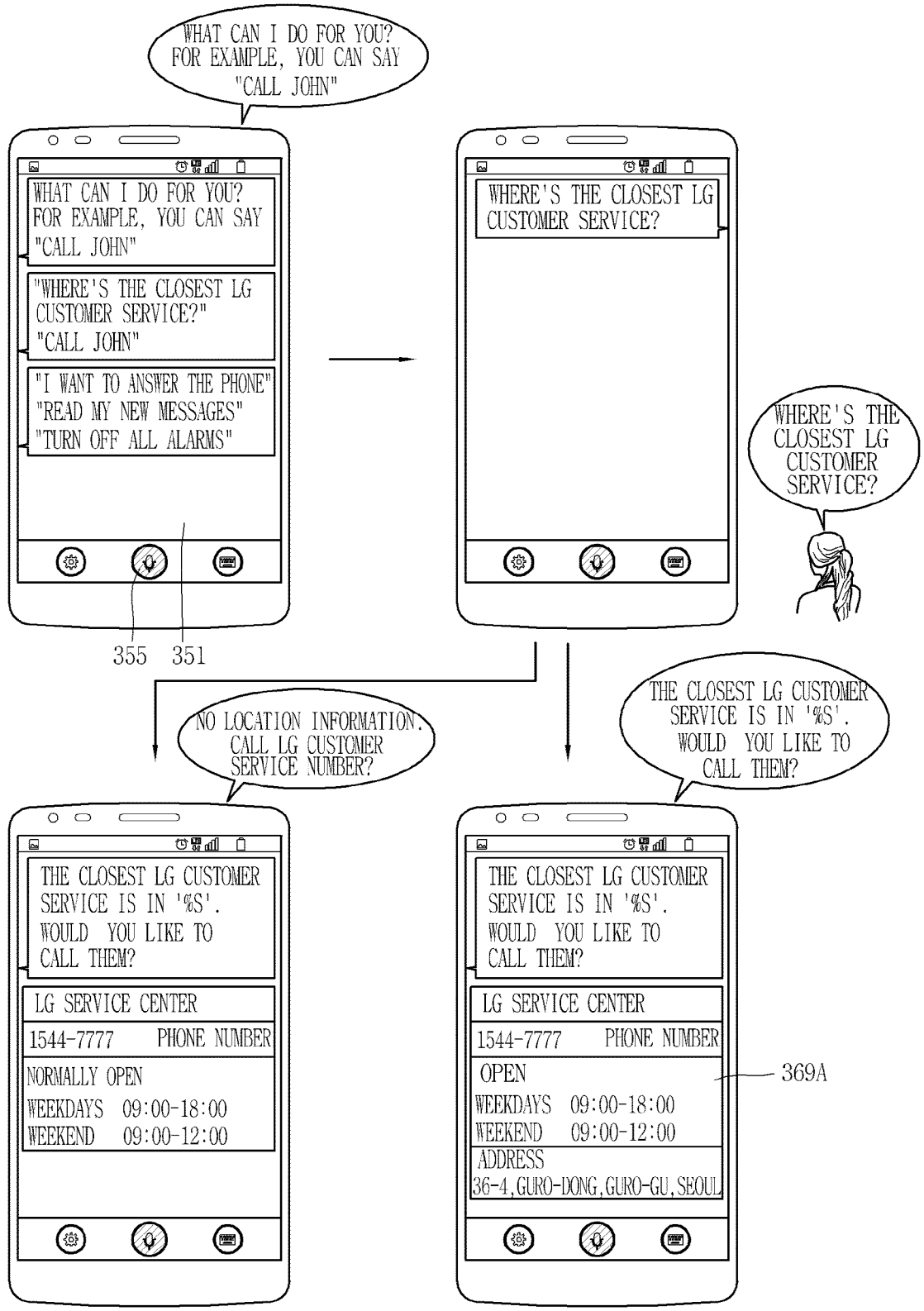

[Fig. 8a]
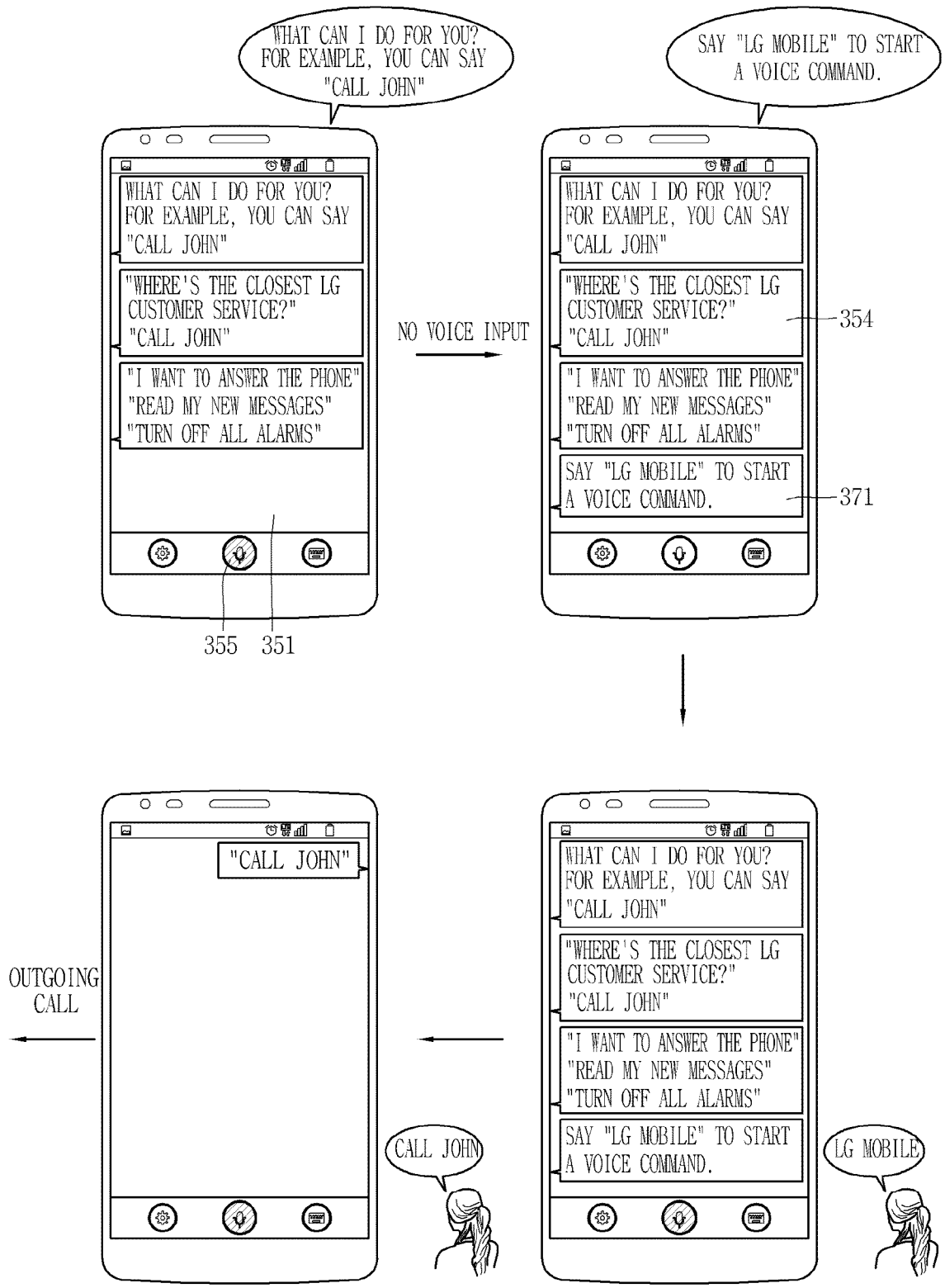

[Fig. 8b]
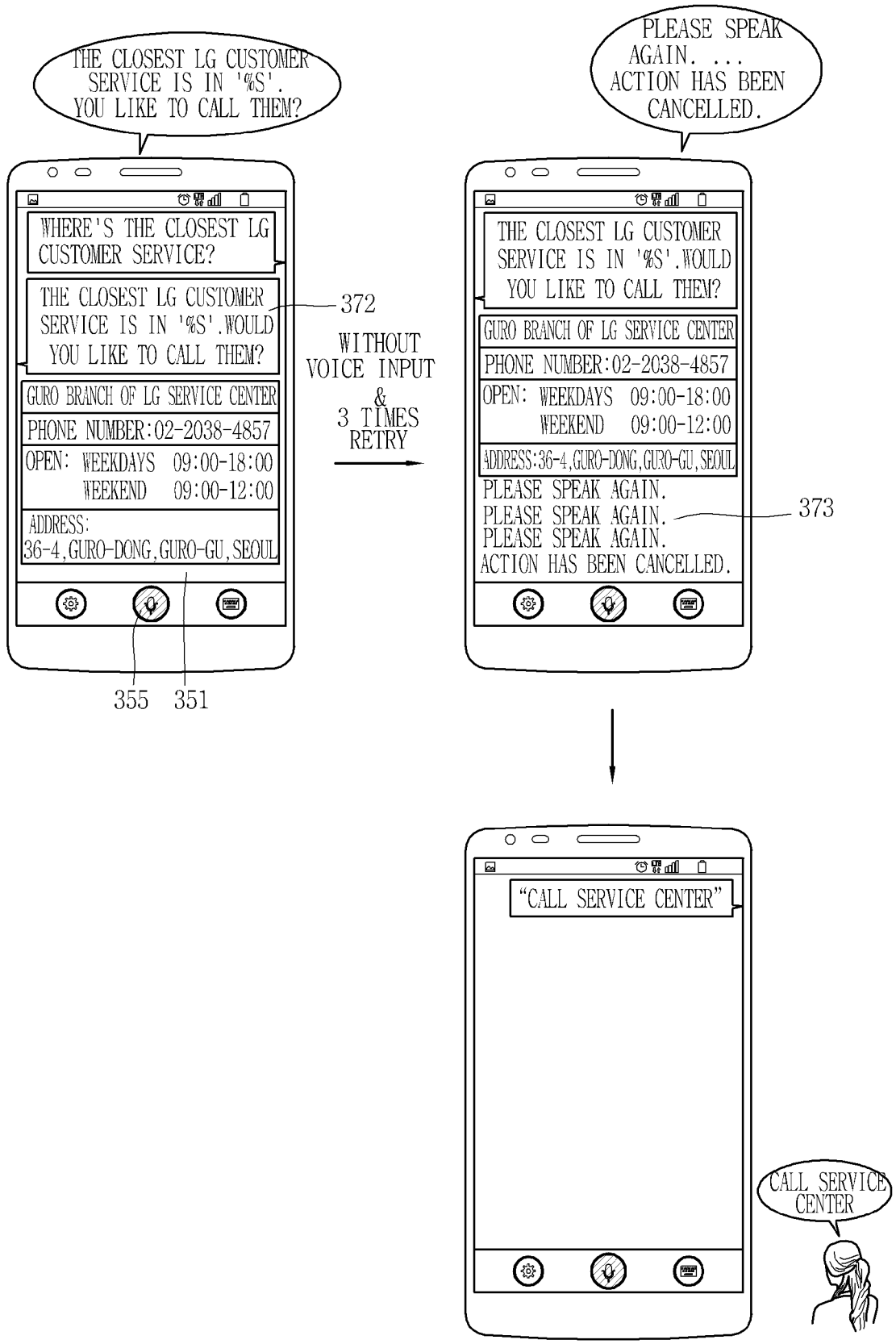

[Fig. 9a]
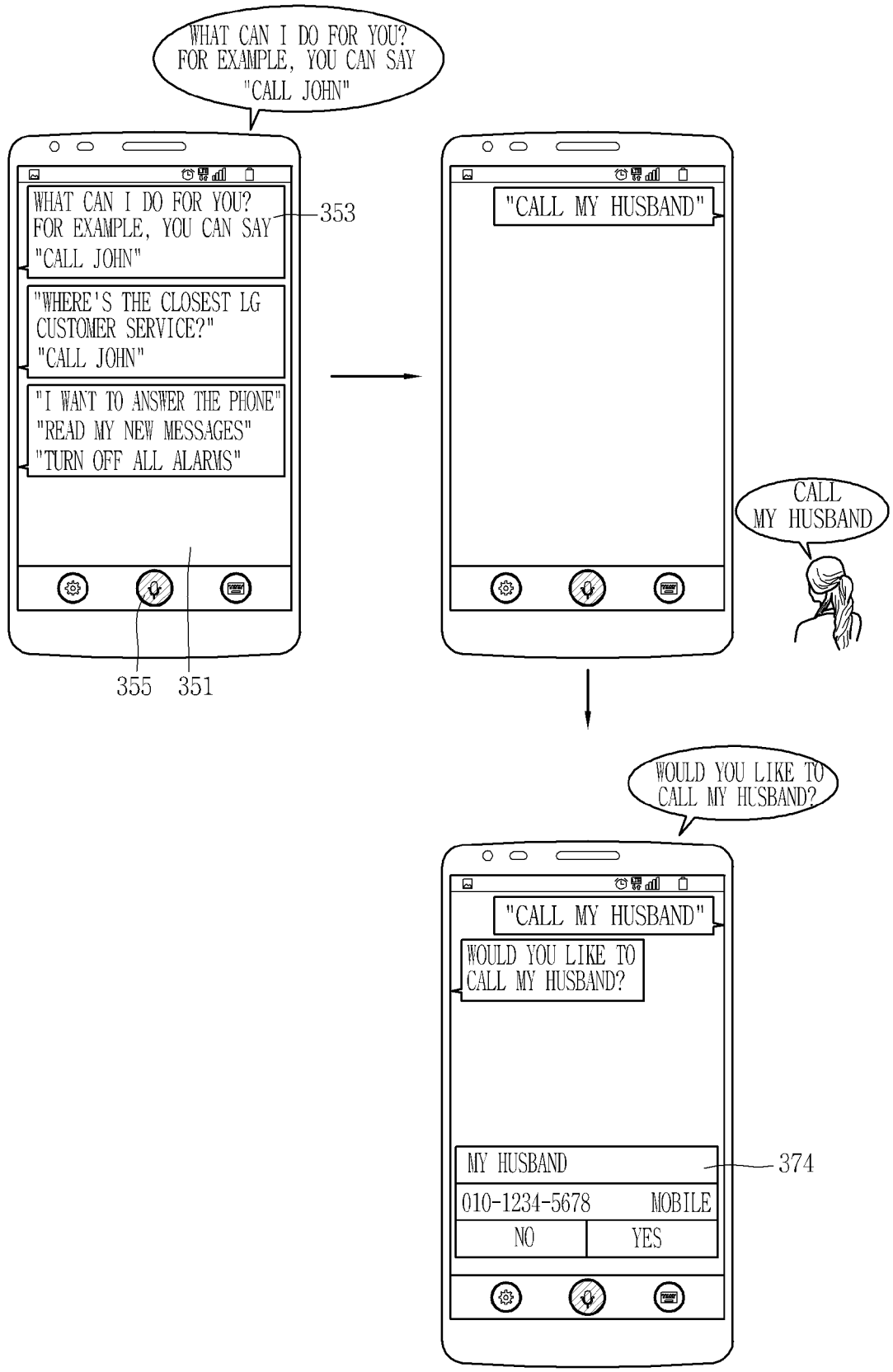

[Fig. 9b]
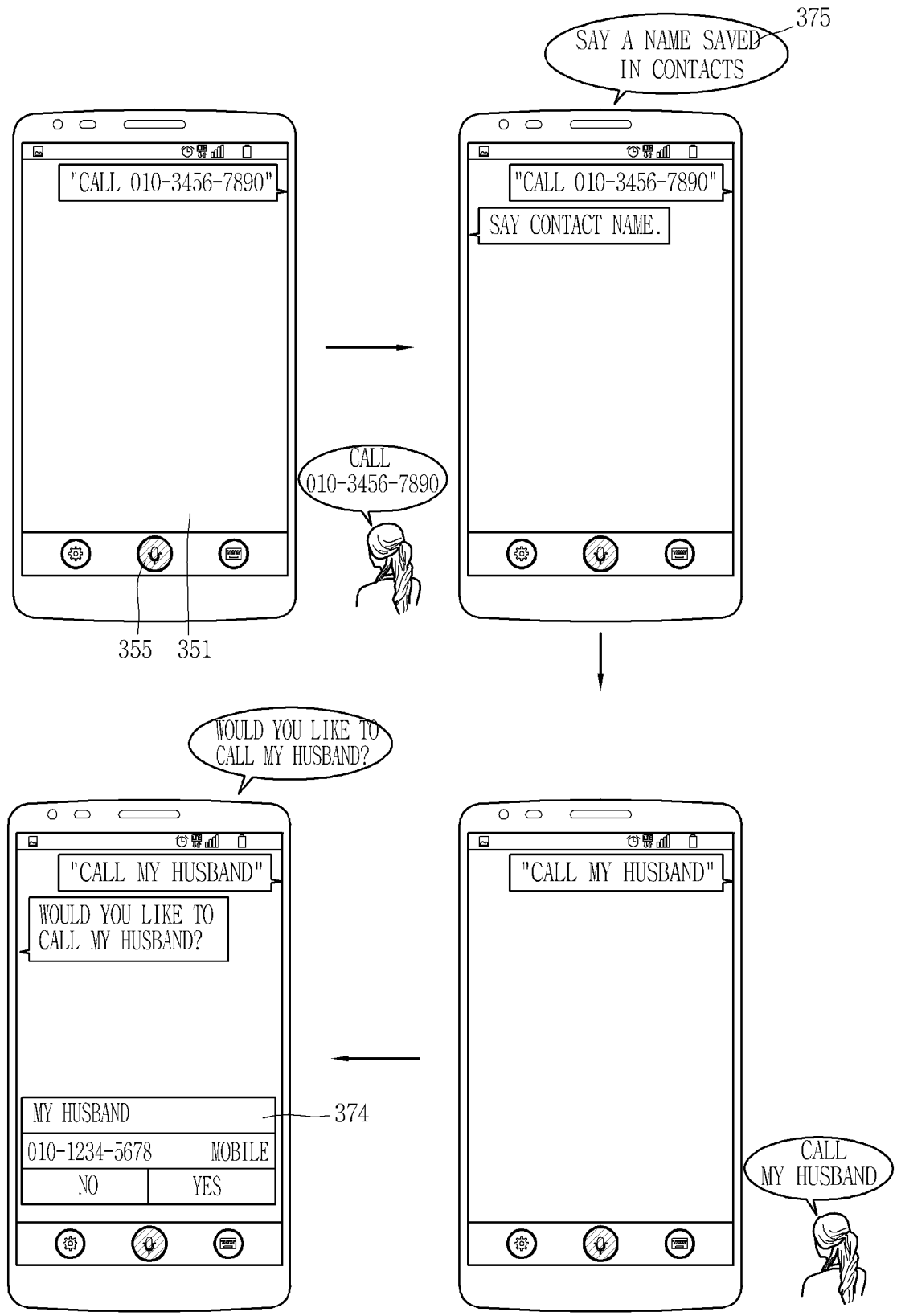

[Fig. 10a]
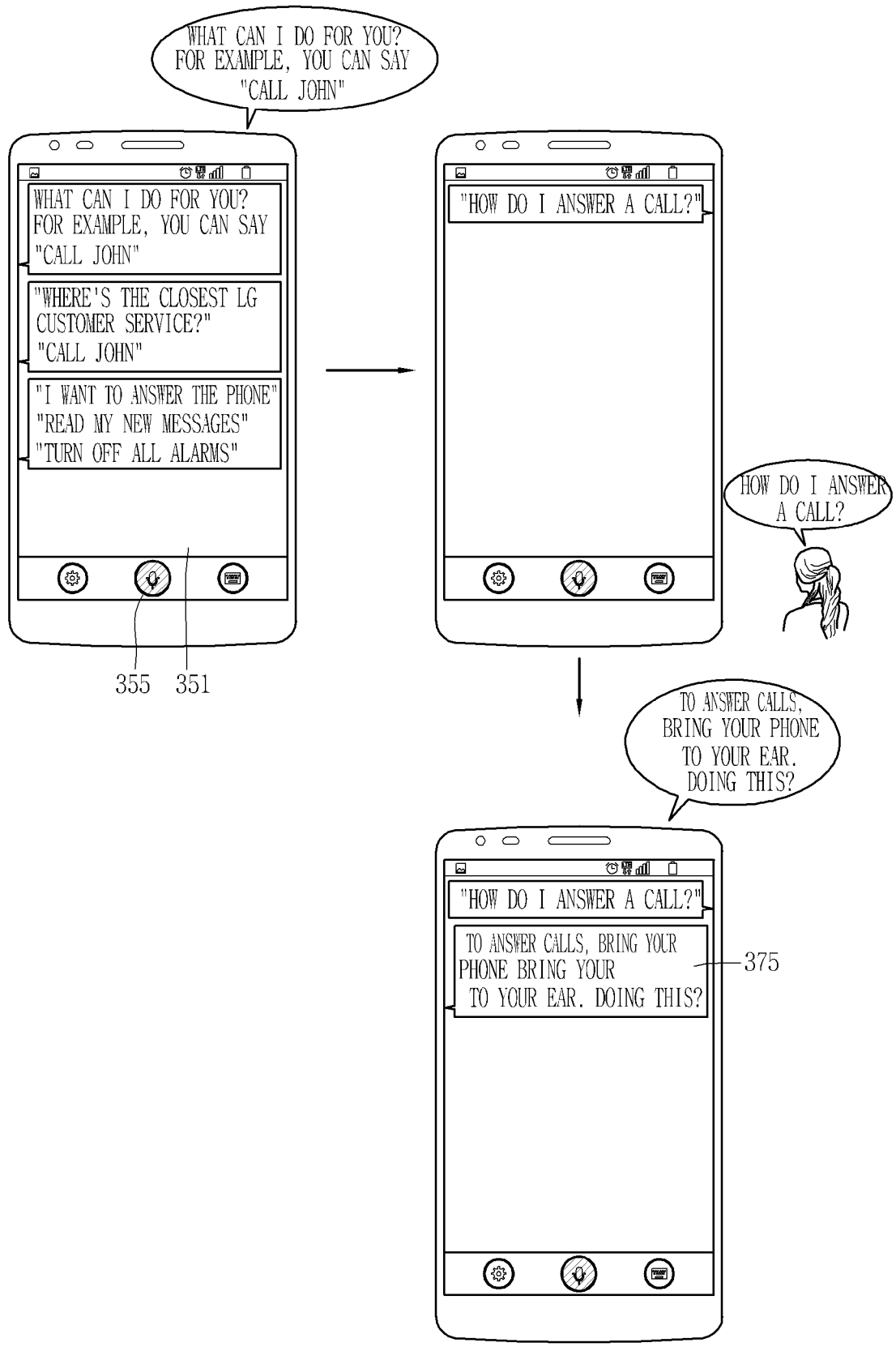

[Fig. 10b]
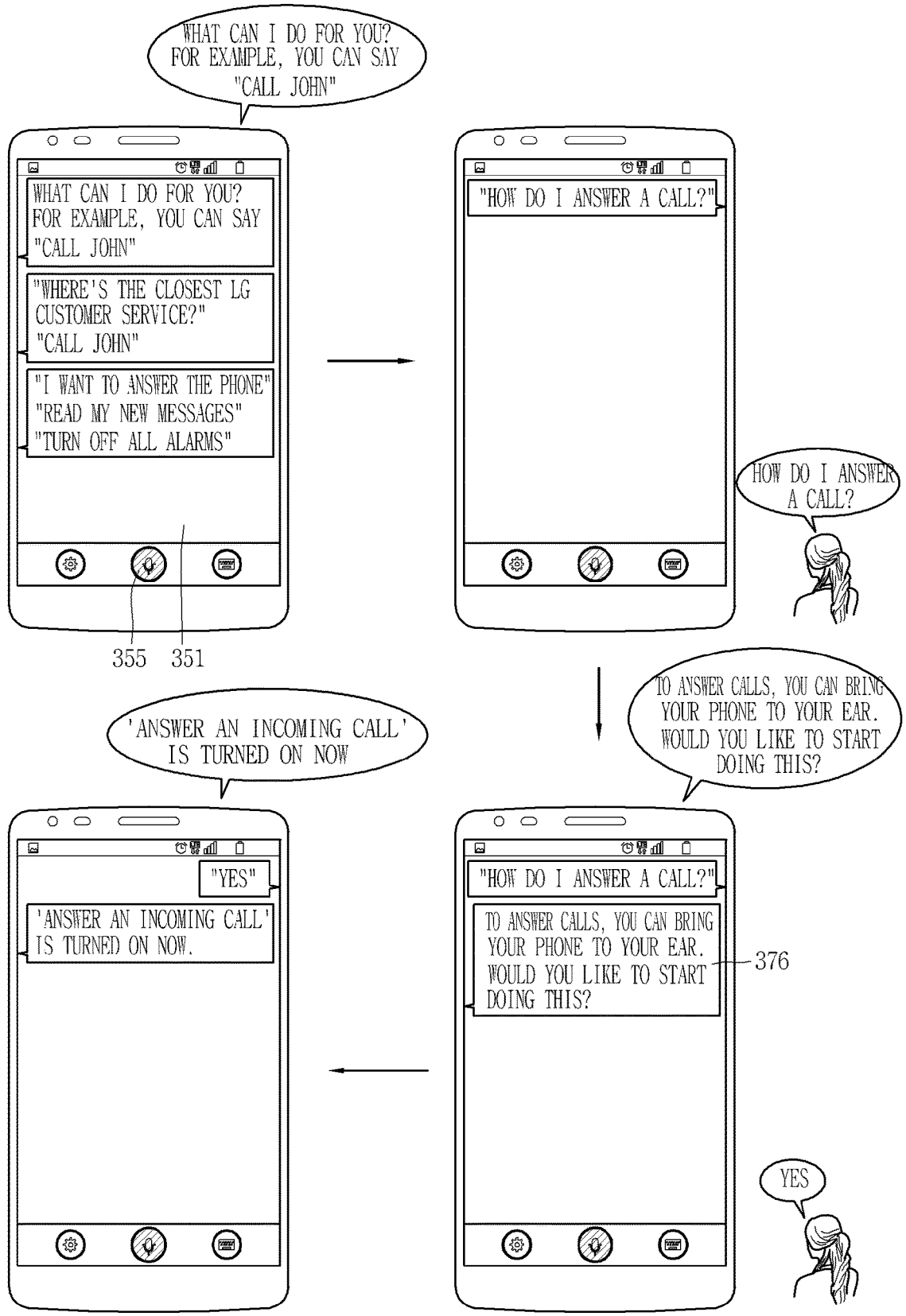

[Fig. 11a]
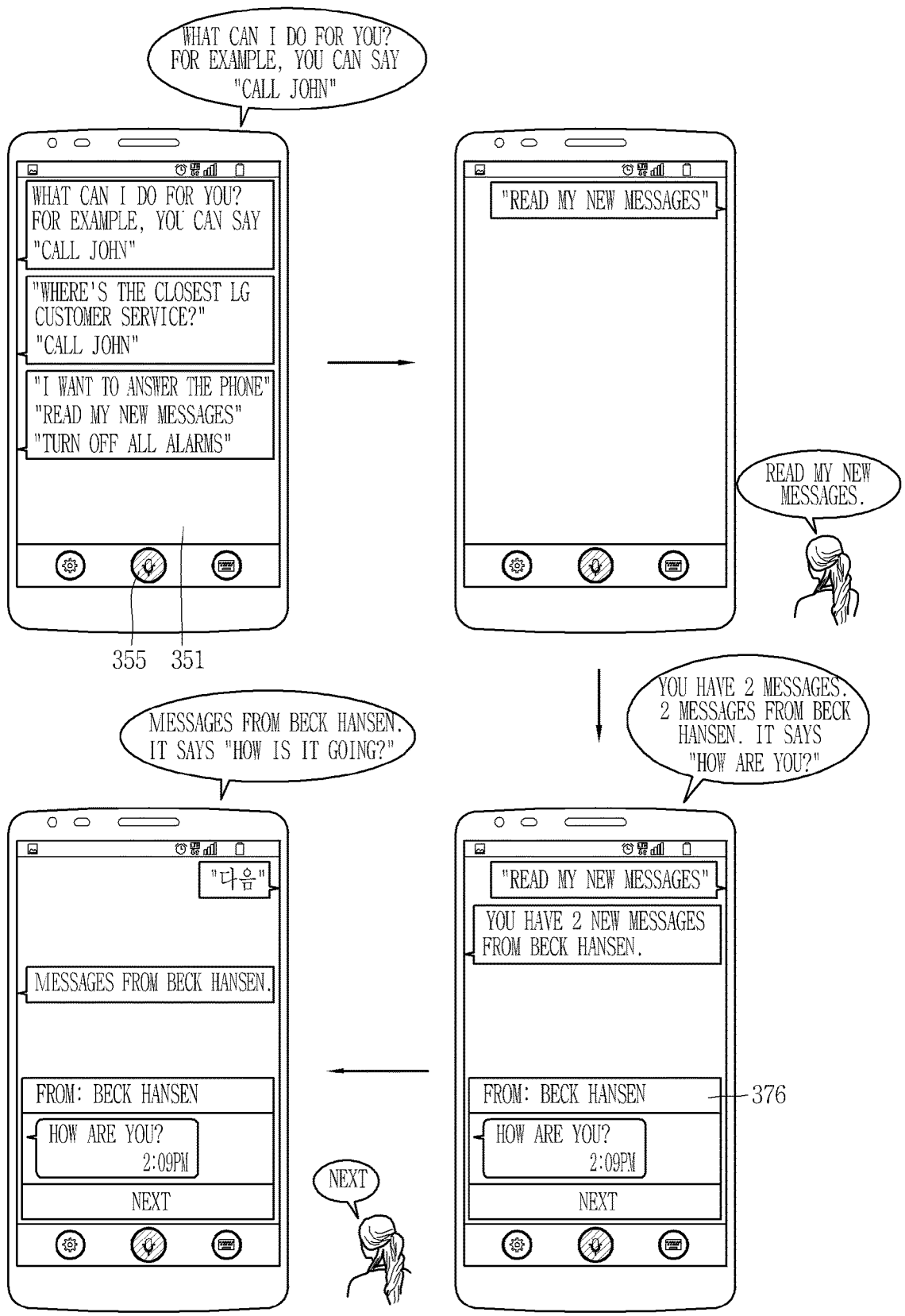

[Fig. 11b]
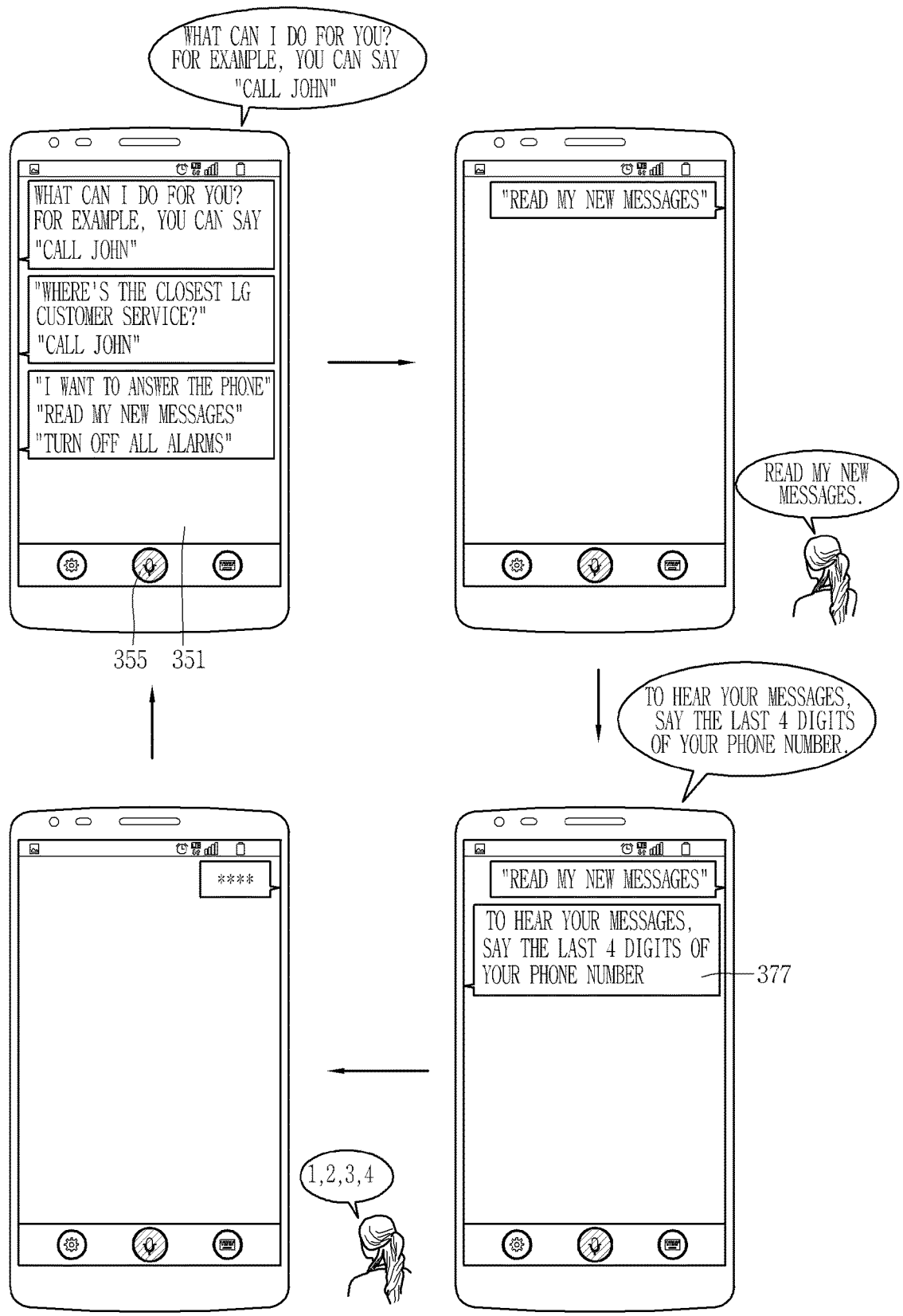

[Fig. 12]
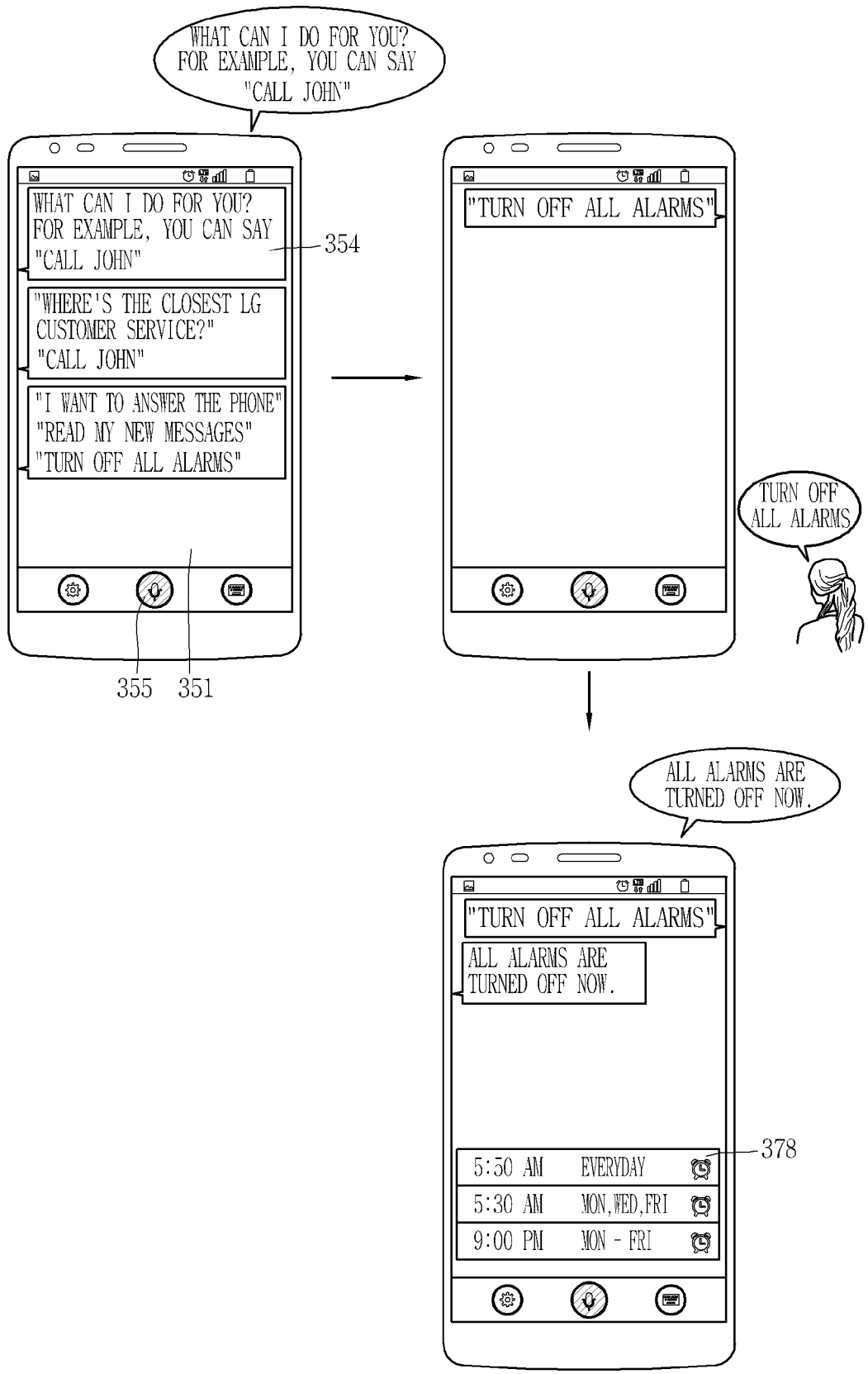

[Fig. 13]
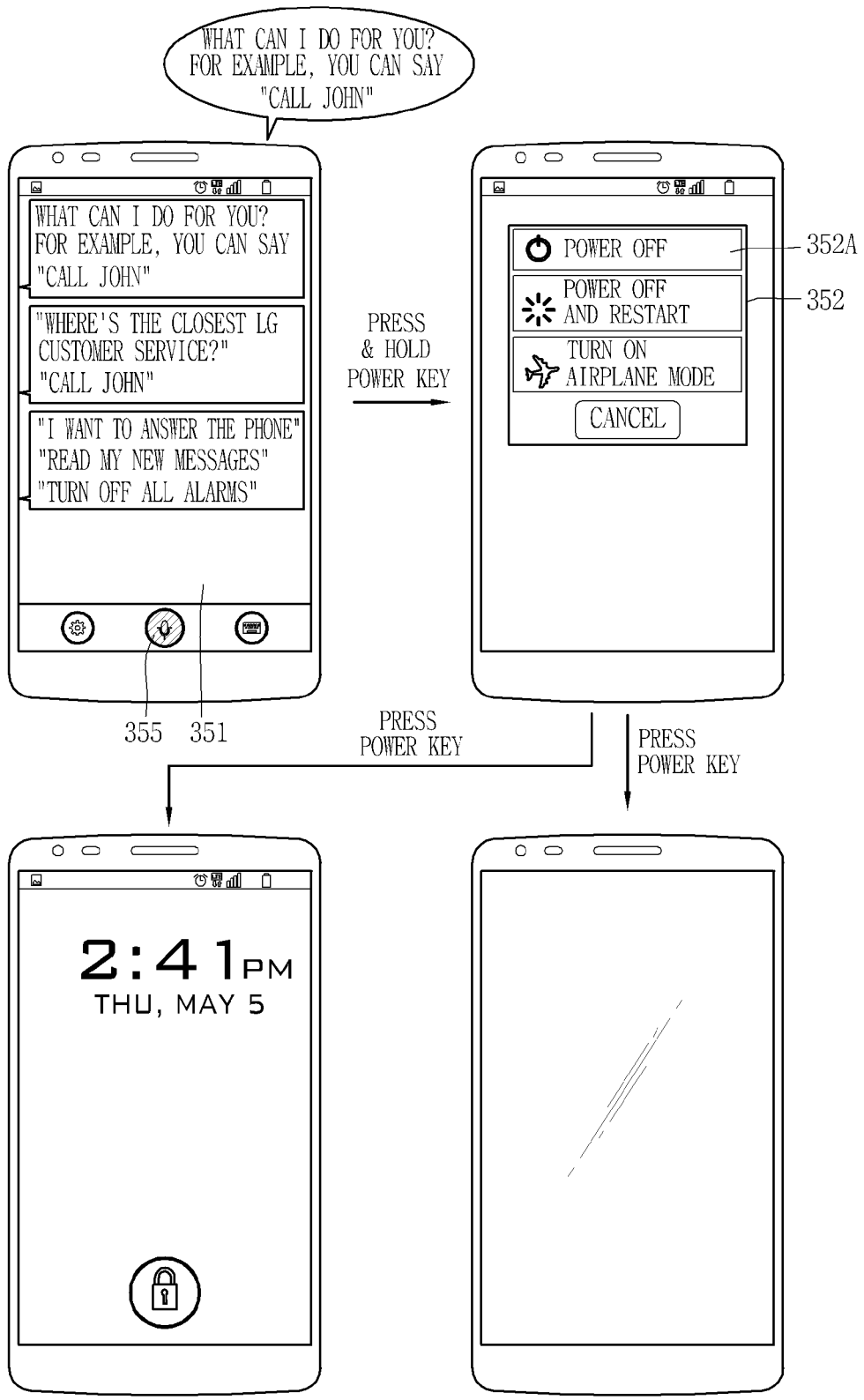

[Fig. 14]
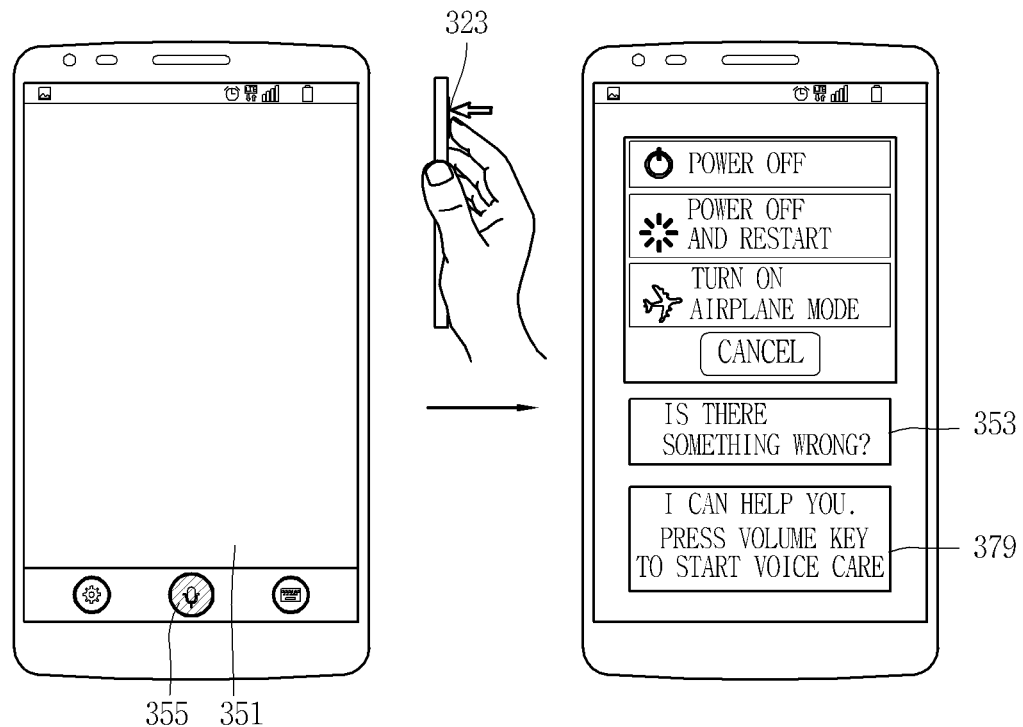
[Fig. 15]
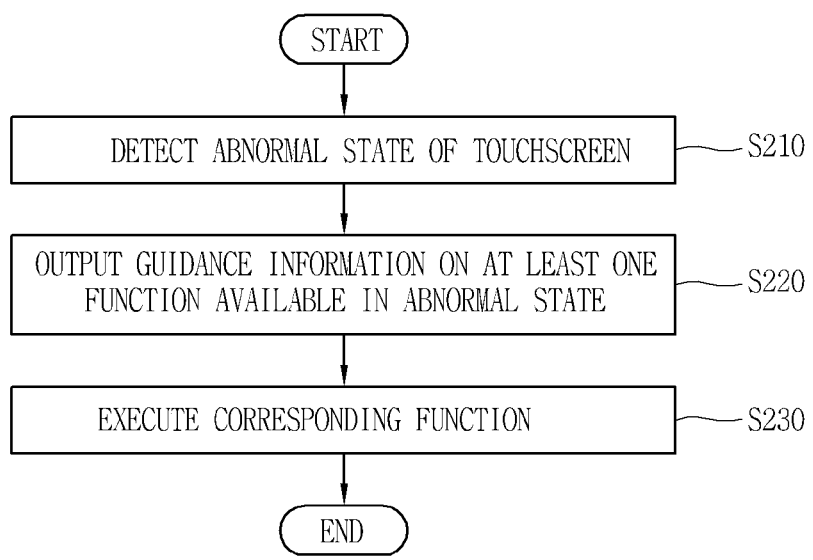

[Fig. 16]
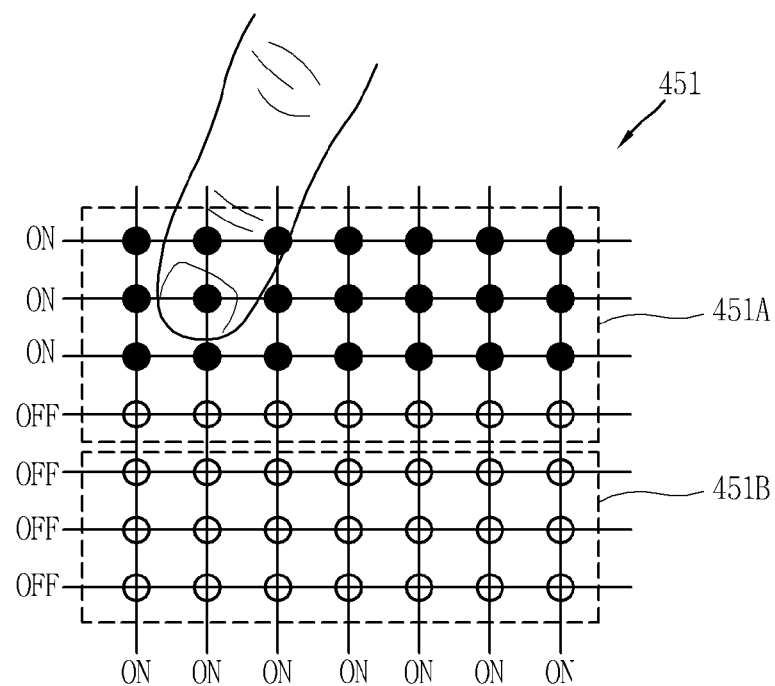

[Fig. 17a]
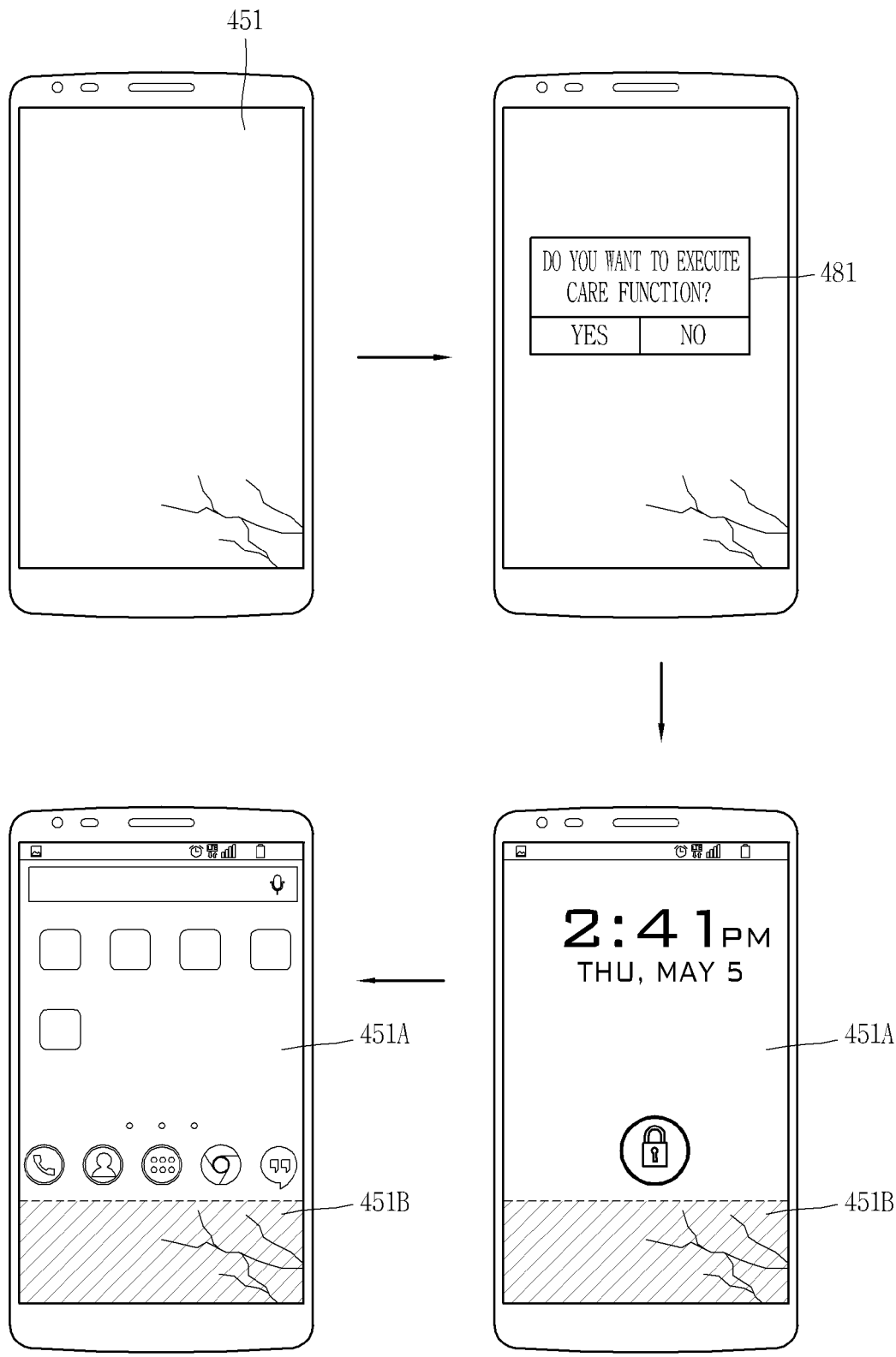

[Fig. 17b]
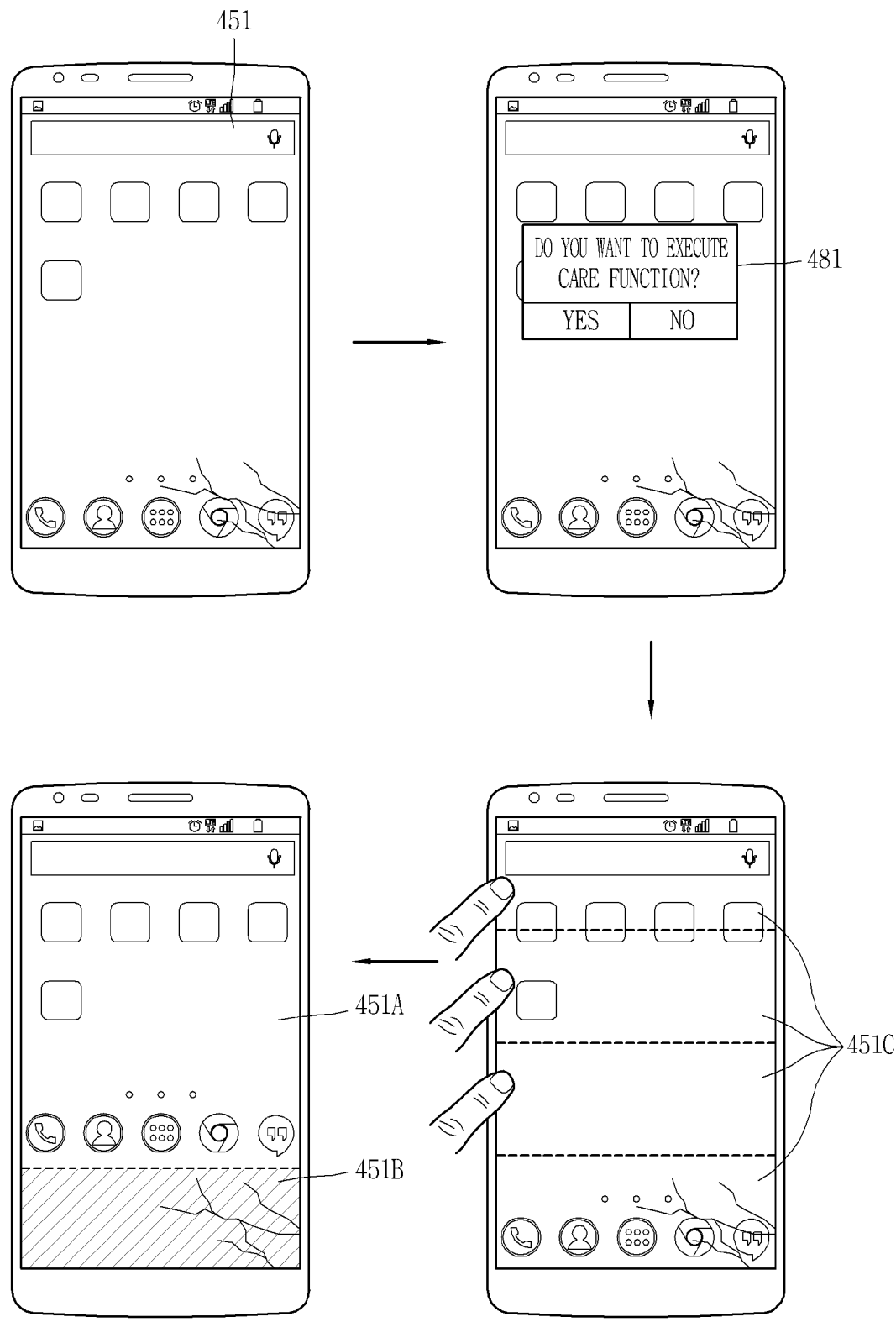

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2015/009458, filed on Sep. 8, 2015, which claims the benefit of earlier filing date and right of priority to Korean Application No. 10-2015-0066235, filed on May 12, 2015, and also claims the benefit of U.S. Provisional Application No. 62/153,377, filed on Apr. 27, 2015, the contents of which are all hereby incorporated by reference herein in their entirety.

TECHNICAL FIELD

The present invention relates to a mobile terminal that has a touchscreen and is capable of speech recognition, and a control method therefor.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players.

Various attempts have been made to implement complicated functions in such a multimedia device by means of hardware or software.

In the case of recent mobile terminals that come with touchscreens, there may be some inconveniences like a damage to the liquid crystals in the touchscreens or a failure of touch input sensing. In this regard, there is a need to find a way to solve any user inconveniences caused in the case of a failure of the touchscreen.

DISCLOSURE OF INVENTION

Technical Problem

Therefore, an object of the present invention is to provide One object of the present invention is to provide a mobile terminal with the feature of sending data to a user and processing input from the user, even when the touchscreen is not functioning normally.

Another object of the present invention is to provide a mobile terminal that has a simple design and offers convenience to the user using a speech recognition function.

Solution to Problem

To achieve these and other advantages and in accordance with the purpose of the present invention, as embodied and broadly described herein, there is provided a mobile terminal, including: a touchscreen disposed on one side of a main body of the terminal; a push key mounted on the main body to receive a push input; and a controller that displays virtual keys associated with the settings or control of the terminal on the touchscreen when the push key is pushed, and executes functions associated with a speech recognition mode when a set period of time elapses without at least one touch input on the virtual keys being sensed.

In the embodiment, the controller may output guidance information for the speech recognition mode if a first period of time elapses without the touch input being sensed, and execute the speech recognition mode if a second period of time elapses after the output of the guidance information.

The guidance information may be output in audio format through audio output parts on the main body. The controller may perform a control operation for deactivating the touchscreen when the speech recognition mode is executed. If the push key is pushed while the speech recognition mode is on, the speech recognition mode may be finished, and the virtual keys may be displayed again on the touchscreen. If the push key is pushed before the elapse of the first period of time, the virtual keys associated with the settings and control of the terminal may disappear.

In the embodiment, the speech recognition mode may include first and second speech recognition modes in which different processing results are output for the same voice command entered through a microphone on the main body, and if the set period of time elapses without at least one touch input on the virtual keys being sensed, a command may be given to execute the first speech recognition mode.

The second speech recognition mode may be executed by touching or pushing a home key on the terminal in a preset pattern. The processing result for the first speech recognition mode may be output through the audio output parts on the main body, and the processing result for the second speech recognition mode may be output through the touchscreen. The user may select whether to execute the first speech recognition mode.

In the embodiment, the controller may ask for authentication information upon receiving a user request to execute a particular function in the speech recognition mode.

The authentication information may be requested in a case where the lock function is enabled in the terminal. The asking for authentication information may be disabled in the speech recognition mode settings. The particular function may include at least either a Call function or a Read messages function. Once the asking for authentication information is disabled, at least either the Call function or the Read messages function may be performed without authentication upon a request from the user, while the terminal is locked.

In the embodiment, the controller may check whether the destination number is included in saved contacts, upon receiving a request from the user to make a call in the speech recognition mode.

If a phone number to be called is entered by voice and the phone number is included in the contacts, the controller may output a guide that asks the user to provide other information associated with the phone number.

In the embodiment, if the set period of time elapses without at least one touch input on the virtual keys being sensed, the speech recognition mode may be executed, and if there is no voice command input from the user in the speech recognition mode, a phrase prompting the user to speak a voice command may be output.

The phrase may be displayed on the touchscreen and disappear when the voice command is recognized.

In the embodiment, if the set period of time elapses without at least one touch input on the virtual keys being sensed, the speech recognition mode may be executed, and the speech recognition mode may offer control functions associated with the turn on/off of alarms.

If the user has multiple alarms set on the terminal, the alarms may be turned off altogether when the user enters a voice command to turn off the alarms in the speech recognition mode.

According to another embodiment of the present invention, a mobile terminal may include: a touchscreen; audio output parts that output audio; a detector that detects an abnormal state of the touchscreen; and a controller that, if an abnormal state is detected, outputs guidance information on at least one function that allows for control of the terminal in the abnormal state through at least either the audio output parts or the touchscreen.

In the embodiment, the detector may detect an abnormal state of the touchscreen by sensing an impact or acceleration on the terminal or sensing information associated with the amount of electric current for controlling the touchscreen.

In the embodiment, if an abnormal state is detected, the controller may output guidance information associated with a speech recognition mode and receive the user's input about whether to execute the speech recognition mode.

In the embodiment, if an abnormal state is detected, the controller may output guidance information associated with a change of a driving method of the touchscreen and receive the user's input about whether to change the driving method. The touchscreen may be divided into a plurality of areas, and upon detecting an abnormal state in some of these areas, the controller may control the touchscreen to display in the remaining area apart from the area where the abnormal state is detected.

Advantageous Effects of Invention

According to the present invention, a speech recognition function may executed in a new way by providing guidance on the speech recognition function if there is no touch input after the push key is pushed. Accordingly, input for executing the speech recognition function may be easily done without a separate push key for executing the speech recognition function. Further, a control method for executing the speech recognition function in the case of a failure of the touchscreen may be implemented. Additionally, control results may be output even in the case of a failure of the touchscreen, thereby increasing user convenience.

Moreover, an abnormal state of the touchscreen may be recognized by a process of sensing a malfunction of the terminal. In this case, user convenience can be improved because a solution is provided to the user to deal with the abnormal state of the touchscreen.

BRIEF DESCRIPTION OF DRAWINGS

FIG. 1A is a block diagram for explaining a mobile terminal related to the present invention;

FIGS. 1B and 1C are conceptual diagrams of an example of a mobile terminal related to the present invention, as viewed from different directions;

FIGS. 2A and 2B are perspective views of a mobile terminal with a push key on the back according to another example of a mobile terminal related to the present invention;

FIG. 3 is a flowchart representing a control method according to the present invention;

FIGS. 4A, 4B, and 4C are conceptual diagrams showing an operation carried out by the previously described control method;

FIGS. 5A, 5B, 5C, and 5D are conceptual diagrams for explaining the execution of a particular function as an example of speech recognition mode control in a mobile terminal according to the present invention;

FIG. 6 is a conceptual diagram for explaining how asking for authentication information is disabled, as another example of speech recognition mode control in a mobile terminal according to the present invention;

FIGS. 7A and 7B are conceptual diagrams for explaining an example in which different processing results are output depending on the speech recognition mode in a mobile terminal according to the present invention;

FIGS. 8A and 8B are conceptual diagrams for explaining another example of speech recognition mode control in a mobile terminal according to the present invention;

FIGS. 9A and 9B are conceptual diagrams for explaining the Call saved contacts function in the speech recognition mode according to the present invention;

FIGS. 10A and 10B are conceptual diagrams for explaining the Receive calls function in the speech recognition mode according to the present invention;

FIGS. 11A and 11B are conceptual diagrams for explaining the Read messages function in the speech recognition mode according to the present invention;

FIG. 12 is a conceptual diagram for explaining the Turn off alarms function in the speech recognition mode according to the present invention;

FIG. 13 is a conceptual diagram for explaining a control method for finishing the speech recognition mode in a mobile terminal according to the present invention;

FIG. 14 is a conceptual diagram for explaining a control method when the speech recognition mode is not enabled yet on a mobile terminal according to the present invention;

FIG. 15 is a flowchart representing a control method for a terminal according to another embodiment of the present invention;

FIG. 16 is a conceptual diagram showing the touchscreen being partially driven by the control method of FIG. 15; and FIGS. 17A and 17B are conceptual diagrams for explaining an example of controlling the touchscreen to be partially driven in a mobile terminal according to the present invention.

MODE FOR THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a unibody is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

FIGS. 2A and 2B illustrates a structure of the mobile terminal where a user inputs a control command in a push manner on a rear surface of the mobile terminal, with viewing a display unit 251. FIGS. 2A and 2B are perspective views of a mobile terminal with a push key on the back according to another example of a mobile terminal related to the present invention.

The mobile terminal includes a case (for example, frame, housing, cover, and the like) forming the appearance of the terminal. In this embodiment, the case is formed using a front case 201 and a rear case 202. Various electronic components are incorporated into a space formed between the front case 201 and the rear case 202. At least one middle case may be additionally positioned between the front case 201 and the rear case 202.

The display unit 251, an audio output unit 252, a camera module 221, etc. may be disposed at the front case 201. An interface 270, etc. may be disposed on side surfaces of the front case 201 and the rear case 202.

The display unit 251 occupies most parts of the front case 201. That is, the display unit is disposed on the front surface of the mobile terminal, and displays visual information. The audio output unit 252 and the camera module 221 are disposed at a region adjacent to one of two ends of the display unit 251, and a microphone 222 is disposed at a region adjacent to another end.

In this embodiment, like in the embodiment aforementioned with reference to FIGS. 1B and 1C, the display unit 251 may form a touch screen together with a touch sensor. In this case, the touch screen may be a user input unit and a visual information output unit. Hereinafter, the display units 151 and 251 aforementioned in the respective embodiments are referred to as touch screens 151 and 251.

Accordingly, the mobile terminal may have no front input unit on the front surface thereof. In this case, the mobile terminal may be configured such that an input to the terminal body is applied only through the touch screen 251 and a rear input unit 232 to be explained later.

Referring to FIG. 2B, a camera module 221' may be additionally provided on the rear case 202. The camera module 221' faces a direction which is opposite to a direction faced by the camera 221 (refer to FIG. 2A), and may have different pixels from the camera 221.

For example, the camera 221 may operate with relatively lower pixels (lower resolution). Thus, the camera 221 may be useful when a user can capture his face and send it to another party during a video call or the like. On the other hand, the camera 221' may operate with a relatively higher pixels (higher resolution) such that it can be useful for a user to obtain higher quality pictures for later use. The cameras 221 and 221' may be installed at the body so as to rotate or pop-up.

A flash and a mirror may be additionally disposed adjacent to the camera 221'. The flash operates in conjunction with the camera 221' when taking a picture using the camera 221'. The mirror can cooperate with the camera 221' to allow a user to photograph himself in a self-portrait mode.

An audio output unit 252' may be additionally arranged on a rear surface of the body. The audio output unit 252' (refer to FIG. 2A) may cooperate with the audio output unit 252 (refer to FIG. 2A) so as to implement a stereo function. Also, the audio output unit may be configured to operate as a speakerphone.

A power supply unit 290 for supplying power to the mobile terminal 200 is mounted to the body. The power supply unit 290 may be mounted in the body, or may be detachably mounted to the body.

A rear input unit 232 is disposed on the rear surface of the mobile terminal. The rear input unit 232 may be disposed below the camera module 221', for example.

Commands inputted through the rear input unit 232 may be variously set. For instance, the rear input unit 232 is configured to input commands such as START, END, SCROLL or the like, and to input commands for controlling a level of sound outputted from the audio output unit 252, or commands for converting the current mode of the display unit 251 to a touch recognition mode.

The rear input unit 232 of this invention may be made in such a way as to allow for push input, and therefore the rear input unit 232 may be a push key that is mounted on the main body and receives push input.

To avoid the formation of a slot for a user input part on the side of the terminal body, along the length of the terminal, the rear input unit 232 overlays the touchscreen 251 along the thickness of the main body, being exposed not to the side of the terminal, but to the back of the terminal.

According to the structures explained with reference to FIGS. 1B, 1C, 2A, and 2B, the first operating unit 123a, the second operating unit 123b, and rear input unit 232 may be push keys individually that are mounted on the main body and receive push input.

A terminal of this invention provides a solution to an abnormal state such as a failure or damage of the touchscreen by a combination of push input on the push keys and touch input on the touchscreen. Examples of the damage or failure of the touchscreen may include a malfunction of touch input sensing on the touchscreen, a damage to the liquid crystals (display part) of the touchscreen, a damage to the window of the touchscreen, and so on.

In this case, the solution to the abnormal state may be the execution of a speech recognition mode. Hereinafter, the speech recognition mode that can be supported under an abnormal state of the touchscreen will be described in more detail with reference to the accompanying drawings.

FIG. 3 is a flowchart representing a control method according to the present invention. FIGS. 4A, 4B, and 4C are conceptual diagrams showing an operation carried out by the previously described control method.

First, in a mobile terminal according to the present invention, when a push key 323 (see FIG. 4A) is pushed, virtual keys associated with the settings or control of the terminal are displayed on the touchscreen 351 (see FIG. 4A). For example, in the mobile terminal according to the present invention, if the push key 323 is pushed, a power control window associated with the power control of the terminal appears on the touchscreen 351 at step S110. Hereinafter, the power control of the terminal is taken as an example of the settings of the terminal, but the present invention is not limited to this example. For example, the settings of the terminal may involve pushing the push key for volume control, accessing a particular mode, and so on.

Herein, the push key 323 may be a push key 323 that is mounted on the terminal body and receives push input, like the first operating unit 123a, second operating unit 123b, and rear input unit 232 explained with reference to FIGS. 1B, 1C, 2A, and 2B. In this case, the push key 323 may be composed of a mechanical or physical button, which is a concept relative to the touchscreen 351. Hereinafter, the push key 323 is taken as an example of the rear input unit 232 (see FIG. 2b), the present invention is not necessarily limited to this example.

Moreover, the push key 323 may have a sensor attached to it to sense the user's motion as well as push input. Examples of the user's motion include a touch on the push key, a contact for fingerprint authentication, a tap or tap gesture, etc.

The push key 323 is disposed to receive control commands on the terminal body or the touchscreen 351.

For example, if the push key 323 is pushed, the touchscreen 351 may switch from inactive state to active state. Also, if the push key 323 is pushed while the touchscreen 351 is active, the touchscreen 351 may switch to inactive state. Herein, activating the touchscreen 351 may mean turning on and off the light on the display part of the touchscreen. In this case, if the push key 323 is long-pressed, the power control window of the terminal may appear on the touchscreen 351. That is, the push key 323 may be a power key for turning on and off the terminal.

In this example, the push key 323 may be, for example, a power key or a home key. In another example, the push key 323 may be a function key that gets the user back to the home screen when a short push is applied and executes a power on/off function when a long push is applied. This example illustrates a power key. The power key may function to turn on and off the touchscreen 351 upon receiving a short push and power on and off the terminal upon receiving a long push.

A more concrete operation example will be given with reference to FIG. 4A. If the push key 323 on the terminal is pushed while the touchscreen 351 is inactive, the touchscreen 351 is activated first. The current time or visual information such as images may be displayed on the activated touchscreen 351.

In this case, a lock screen may appear on the activated touchscreen 351. While the lock screen is on (or in the lock mode), the touchscreen 351 may only sense touch input associated with unlocking. Also, the lock screen may appear if the the lock function is enabled in the terminal.

Afterwards, if the user keeps pushing the push key 323, the power control window 352 appears (see FIG. 4B).

In this case, virtual keys 352a associated with the power control of the terminal may be provided at the power control window 352. Also, the power control window 352 may pop up on the touchscreen 351. The virtual keys 352a are touch keys displayed on the touchscreen: for example, they may have items such as power off, power off and restart, turn on airplane mode, etc. When the touch key 352a of any of these items is touched, the touchscreen 351 creates a signal for sensing the touch input, and the controller processes the signal and performs a control operation for that item.

Referring again to FIG. 3, when a set period of time elapses without at least one touch input on the virtual keys 352a being sensed, functions associated with the speech recognition mode are executed at steps S120, S130, S140, and S150. If predetermined time is passed over in a state where a touch input is not applied to the virtual keys 352a, functions associated with the speech recognition mode are automatically executed.

For example, first of all, if a certain period of time elapses without any touch input on the power control window 352 being sensed, guidance information 353 for the speech recognition mode may be output at step S120. More specifically, the controller outputs guidance information 353 for the speech recognition mode if a first period of time elapses without the touch input being sensed. In this case, the first period of time may be several seconds, for example.

Afterwards, after the elapse of another certain period of time at step S130, or when a speech recognition mode start-up command is entered at step S140, the speech recognition mode may be executed at step S150.

For example, the controller executes the speech recognition mode if a second period of time elapses after the output of the guidance information 353. In this case, the second period of time may be several seconds, for example.

In another example, if a virtual key for a "start now" item is displayed together with the guidance information, and the user touches the virtual key, the speech recognition mode may be executed.

In yet another example, if the user gives a voice command to execute the speech recognition mode through a microphone on the terminal, the speech recognition mode may be executed. If the guidance information is output for this operation, the speech recognition function using the microphone may be activated. Therefore, this example involves a case in which part of the speech recognition mode starts along with the displaying of the guidance information, and the controller executes all of the functions of the speech recognition mode in response to the speech coming through the microphone.

Meanwhile, if the speech recognition mode is executed after the elapse of a set period of time, without at least one touch input on the virtual keys 352a being sensed, it may be defined as a first speech recognition mode, which is executed upon predicting an abnormal state of the touchscreen 351. Because the first speech recognition mode is a mode that makes user input easy even when the touchscreen 351 is in an abnormal state, it may be defined as voice care. Herein, the voice care function means that, in the case of a failure or damage of the touchscreen 351, speech recognition and processing allows for informing the user of this failure or damage and processing the user's input.

On the contrary, the speech recognition mode may be executed by touching or pushing the home key (not shown) on the terminal in a preset pattern. In this case, the speech recognition mode may be defined as the second speech recognition mode.

The home key is a push key or touch key provided on the terminal, which may be a key that lets the user return to the home screen page when an input is applied while a particular application is running. For example, if the home key is pushed while a webpage is displayed on the touchscreen, the user may return to the home screen page.

Herein, the home screen page also may be referred to as an idle screen. If the terminal is in standby, the home screen page may appear on the touchscreen 351. Icons or widgets of applications installed on the mobile terminal may be displayed on the home screen page. Also, multiple home screen pages may be created depending on the user's selection or the number of applications installed on the terminal.

The second speech recognition mode may be a mode in which the user's speech received through a microphone 222 (hereinafter, see FIG. 2A) is recognized, recognition result data is created, and the result data is output. To this end, a speech recognition engine may be driven in the second speech recognition mode.

The speech recognition engine analyzes the meaning and context of a speech received (input) using a speech recognition algorithm, within the database. For example, the speech recognition engine may convert speech to text data and store it in the database by using an STT (speech-to-text) algorithm. The user's speech may be converted into multiple data streams by means of the speech recognition algorithm. In this case, the speech recognition engine may estimate the rate of recognition of multiple data streams, and select one with the highest recognition rate.

On the contrary, the first speech recognition mode previously described may be a speech recognition mode that performs a function (voice care function) suitable for an abnormal state of the touchscreen 351, in addition to the functionality of the second speech recognition mode in which the user's speech received through the microphone 222 is recognized, recognition result data is created, and the result data is output, and in which the speech recognition engine is driven.

As explained above, according to the present invention, whether to perform the voice care function or not may be determined depending on whether a push key 323 on the terminal is pushed and whether a touch input is received following the push input. A scenario for executing the speech recognition mode (i.e., first speech recognition mode) with the voice care function may be a basic operation scenario for the second speech recognition mode, with the addition of the voice care function.

Referring to FIG. 4C, if a certain period of time elapses after the power control window 352 appears by the control operation of FIG. 4B, without any touch input on the power control window 352 being sensed, the guidance information 353 for the first speech recognition mode is output.

For example, the guidance information may be output after the elapse of, e.g., 5 seconds, without the touch input being sensed.

The guidance information 353 is information that the first speech recognition mode can be executed: for example, a phrase like "Is there something wrong?" I can help you. Starting Voice Care in 5 sec?" may be output on the touchscreen 351, together with the power control window 352. The guidance information 353 may be output in audio format through audio output parts 252 and 252' on the main body. In a more concrete example, this phrase may be spoken in audio format using the audio output parts 252 and 252' on the terminal, based on the TTS (text-to-speech) technology.

Afterwards, if the power control window 352 is not touched for 5 seconds, for example, or a touch input on the virtual key for the "Start now" item is sensed, the voice care function is executed. Although not shown, the virtual key for "Start now" may be displayed along with the guidance information 352. In this case, as described above, the user may give a voice command to execute the first speech recognition mode through the microphone 222 on the terminal. However, the present invention is not limited thereto, and the user may give a voice command to execute the second speech recognition mode, in which case the second speech recognition mode is executed.

When the first speech recognition mode is executed, voice command examples may be displayed on the touchscreen as a first speech recognition mode execution screen. These examples may include "Where's the closest LG customer service?", "Call John", "I want to answer the phone", "Read my new messages", or "Turn off all alarms", and may be spoken in audio format using the audio output parts 252 and 252' on the terminal. In this case, the microphone 222 is activated to receive the user's speech, and an icon 355 indicating that speech recognition is on may appear.

Meanwhile, if the push key 323 is pushed before the elapse of a certain period of time while the power control window is open or the guidance information is displayed, the power control window 352 or the guidance information disappears. In this case, if the user long-presses the push key 323, the power control window may appear again.

Referring to the drawings, if a certain period of time elapses without the user's input during that period of time, while the first speech recognition mode is on, the controller may control the touchscreen 351 to dim the light. Afterwards, if another certain period of time elapses, the touchscreen 351 may be deactivated. Nevertheless, the first speech recognition mode may continue. In this way, the controller may perform a control operation for deactivating the touchscreen 351 when the first speech recognition mode is executed.

While the touchscreen 351 is inactive and the first speech recognition mode is on, if the push key 323 is pushed for a short time, or a separate home key is pushed, or the touchscreen 323 is touched, the touchscreen 351 may be activated again. The first speech recognition mode execution screen may appear again on the activated touchscreen 351, and the above-mentioned voice command examples 354 may be displayed on the execution screen. In this case, the microphone 222 may be activated again to receive the user's speech, and the icon 355 indicating that speech recognition is on may appear.

Moreover, if the push key 323 is long-pressed while the execution screen is on or the touchscreen 351 is inactive and the first speech recognition is on, the first speech recognition mode may be finished and the power control window 352 may appear again on the touchscreen 351.

The control method of this invention that executes the first speech recognition mode with the voice care function if the touchscreen 351 is in an abnormal state has been described so far. By guiding the user to the speech recognition function if there is no touch input after input on the push key 323, the speech recognition mode with the voice care function may be executed in a new, different way from a general speech recognition mode.

Hereinafter, several control methods to be used after execution of the first speech recognition mode with the voice care function will be described in more detail with reference to the drawings. Hereinbelow, the first speech recognition mode and the second speech recognition mode will not be distinguished, and the first speech recognition mode will be referred to the speech recognition mode.

FIGS. 5A, 5B, 5C, and 5D are conceptual diagrams for explaining the execution of a particular function as an example of speech recognition mode control in a mobile terminal according to the present invention.

First of all, referring to FIG. 5A, when the speech recognition mode with the voice care function is executed, voice command examples 354 may be displayed on the touchscreen 351 as described above. These examples may include a command input for calling (input and execution command for call signaling) like "Call John". The voice command examples 354 for calling may be spoken in audio format using the audio output pars 252 and 252' on the terminal. In this case, speech recognition through the microphone 222 may be performed, and an icon indicating this may appear.

Next, when the user says any of these voice command examples, the terminal recognizes and analyzes it. For example, the user may say a voice command, like "Call mom", to call a specific person. In this case, the voice command spoken by the user may be displayed as text on the touchscreen 351 of the terminal. By this, the user may make sure whether the voice command spoken by them is correctly sent. In another example, the terminal may output the voice command in audio format through the audio output parts 252 and 252'. However, the above Call function may be performed only for the contacts saved in the terminal.

In this case, the user may be asked whether they want to perform a control operation for the voice command. For example, a command confirmation phrase (or information for confirmation), such as "Would you like to call mom?", may be displayed on the touchscreen, and the confirmation phrase may be output in audio format. In this case, an execution screen 356 for executing the voice command may be displayed on the touchscreen 351. The confirmation phrase may be displayed on the execution screen 356, and touch keys for selecting whether to perform the control operation, for example, keys for "Yes" or "No" may be displayed on the touchscreen.

Lastly, when the user selects to perform the control operation, a call signal is sent to the terminal of a specific person the user has entered. The selection may be made by touching the key for "Yes", or when the user enters a command for performing the control operation, like saying "Yes" with their voice.

Meanwhile, according to the present invention, the controller may ask for authentication information upon receiving a user request to execute a particular function in the speech recognition mode. The authentication information may be requested in a case where. For example, if the safety lock on the terminal is turned on with either a pattern, note code, PIN, password, or fingerprint, an authentication information request procedure may be performed. However, the present invention is not limited thereto, and the authentication information request procedure may be performed even when the safety lock on the terminal is not turned on. In another example, the user may select to be asked for authentication information in individual settings, regardless of the safety lock.

In this case, the Call function illustrated in FIG. 5A may be executed through authentication. In another example, the particular function may include a Read messages function, and therefore the Read messages function may be executed through authentication, which will be described later.

A concrete example of asking for authentication information will be given. Refen to FIG. 5B' voice command examples are displayed on the touchscreen 351, as in the examples given with reference to FIG. 5A, and when the user says any of these voice command examples, the terminal asks the user to provide authentication information. The authentication information may be a PIN number or password, for example. The PIN number may be a number set by the user, and the password may be the last four digits of the user's phone number.

In an example of asking for authentication information as the PIN number, a guidance phrase (or information) 357 that guides the input of authentication information such as "To make calls or hear your messages, say your 4-digit PIN" may be displayed on the touchscreen 351, and the guidance phrase 357 may be output in audio format. In this case, the speech recognition mode execution screen may keep appearing on the touchscreen.

Next, the terminal compares set authentication information with data input by the user. If the two match, the authentication procedure is completed. Once the authentication procedure is complete, the user gets back to the initial screen (the first image of FIG. 5B). Herein, the initial screen may be a screen where the speech recognition mode with the voice care function is executed and voice command examples are displayed on the touchscreen. These examples may include a command input for calling (input and execution command for call signaling) like "Call John". The voice command examples 354 for calling may be preferentially spoken in audio format using the audio output pars 252 and 252' on the terminal. In another example, the voice command examples for calling may be output alone without any other examples on the touchscreen 351, or may be highlighted. In this case, speech recognition through the microphone 222 may be performed, and an icon indicating this may appear.

After completion of the authentication procedure, if the user enters again a voice command, like "Call mom", to call a specific person, the call may be made without further authentication. The entire Call function described previously in the example given with reference to FIG. 5A may be applied when making calls without further authentication. A description of this can be substituted with the foregoing description.

After completing the authentication procedure once for the first time, the particular function may be executed without re-authentication until the speech recognition mode is finished. By the way, even if the authentication procedure is completed once for the first time, the user may be asked again to go through the authentication procedure when dialing a contact that is not on the terminal. Accordingly, it is possible to find in the terminal whether the specific person is a saved contact or not, and a different type of control is performed depending on whether the specific person is saved or not.

In another example, the authentication procedure may be performed only for contacts that are not on the terminal. In this case, if the specific person whom the user makes a call request to is someone saved in the contact list, the call may be made without authentication, or if not, the above-description authentication procedure may be performed.

Referring to FIGS. 5C and 5D, if authentication information entered according to the procedure of FIG. 5B is different from previously set or saved authentication information, the authentication fails, and the execution of the above-explained particular function is restricted.

For example, as shown in FIG. 5C, if the user enters data by voice while the terminal is asking the user to provide authentication information, this data is compared with previously set or saved authentication information. If the two do not match, a phrase 358a that prompts the user to retry is spoken. The phrase 358 may be displayed in text on the touchscreen. In this case, speech recognition through the microphone 222 may continue, and an icon indicating this may keep appearing.

The user may retry a first preset number of times in the case of an authentication failure. If a second number of errors occur before the first number is reached, a warning phrase 358b may be output. For example, the user may retry 10 times in the case of an authentication failure, and a warning phrase 358b may appear if 5 errors occur. As shown in the drawings, the warning phrase 358b may be information that the corresponding function may be restricted, like "Wrong PIN for the 5th time. 5 attempts remaining before making calls and hearing messages are restricted", in addition to the number of attempts made and the number of attempts remaining. The warning phrase 358b may be output in audio format. Also, the warning phrase 358b is displayed in text on the touchscreen 351. In this case, the waring phrase 358b may be displayed in a different color from the above-mentioned voice command examples.

If the preset number of authentication attempts failed, the controller restricts a particular function such as the Call function or the Read messages function, as in the last image of FIG. 5C. The restriction on the particular functions may be output in audio format and known to the user, and the restriction phrase output in audio format may be displayed in text on the touchscreen 351.

If a particular function is restricted as described above, the controller may control the speech recognition mode in such a manner that the other functions alone are executed. For example, as shown in FIG. 5D, phrase examples may only include examples associated with available functions once the particular function is restricted. More specifically, examples associated with particular functions, like "Call John" and "read my new messages" that have been included as examples in the foregoing embodiment will be excluded, and available examples like "Where's the closet LG customer service?" may be displayed on the touchscreen or output in audio format.

Moreover, once the particular function is restricted, if a voice command like "Call mom" is given to execute the particular function, a phrase 358c saying that the particular function is not available may be displayed on the touchscreen 351 or output in audio format.

Depending on the lock function settings on the terminal, the restriction on the particular function may be removed when the safety lock is disabled. For example, the authentication information may be requested in a case where the lock function is enabled in the terminal, as described above. For example, if the safety lock on the terminal is turned on with either a pattern, note code, PIN, password, or fingerprint, an authentication information request procedure may be performed. Afterwards, in a case where a particular function is restricted because safety authentication fails a preset number of times, the restriction on the particular function may be removed when the safety lock is disabled with at least one among the pattern, note code, PIN, password, and fingerprint.

Meanwhile, the asking for authentication information may be disabled in speech recognition mode settings. Once the asking for authentication information is disabled, at least either the Call function or the Read messages function may be performed without authentication upon a request from the user, while the terminal is locked. An example of disabling asking for authentication information will be described below in more detail with reference to FIG. 6.

FIG. 6 is a conceptual diagram for explaining how asking for authentication information is disabled, as another example of speech recognition mode control in a mobile terminal according to the present invention.

The speech recognition mode may allow for user settings for each control option. For example, an option 359 of determining whether to omit an unlocking process may be listed in the speech recognition mode settings window. The option may be an option of performing the Skip secured Lock screen function, for example.

As shown in the first image of FIG. 6, the user may select to omit the unlocking process by touch input, whereby the Skip secured Lock screen function is executed. Once the Skip secured Lock screen function is executed, asking for authentication information is disabled. In this case, the speech recognition mode may be executed without authentication on the lock screen shown in the second image of FIG. 6. The execution of the speech recognition mode may be started by any one of the above-described methods. When the speech recognition mode is executed, voice command examples 354 may be displayed on the touchscreen 351 as a speech recognition mode execution screen. These examples 354 may be spoken in audio format using the audio output parts 252 and 252' on the terminal. In this case, the microphone 222 is activated to receive the user's speech, and an icon 355 indicating that speech recognition is on may appear.

When the Call function or Read messages function is executed by speech recognition, while the lock screen is on, various information associated with this function may be output and displayed on the touchscreen 351. In another example, when the lock screen appears after an event occurs to the terminal, relevant information may be output in audio format. In this case, information to be output in the locked state may be displayed on the touchscreen 351. In yet another example, when an event occurs to the terminal while the lock screen is on, relevant information may be output in audio format, and displayed as text or image on the touchscreen 351.

As explained above, when executing a particular function in the speech recognition mode, asking for authentication information may be disabled in the speech recognition mode settings. Once the asking for authentication information is disabled, the Call function or Read messages function may be performed without authentication upon a request from the user, while the terminal is locked.

Meanwhile, a speech recognition mode (or first speech recognition mode) with the voice care function may be controlled by a different process from that of a speech recognition mode (or second speech recognition mode) executed by touching or pushing the home key on the terminal in a preset pattern. To explain this example, the speech recognition mode may be classified and referred to as the first speech recognition mode and the second speech recognition mode, which will be described in more detail with reference to FIGS. 7A and 7B.

FIGS. 7A and 7B are conceptual diagrams for explaining an example in which different processing results are output depending on the speech recognition mode in a mobile terminal according to the present invention.

Referring to these drawings, the terminal outputs different processing results in the first speech recognition mode and second speech recognition mode, upon receiving the same voice command.

When a voice command is received while the speech recognition mode is on, the speech recognition engine analyzes the meaning and context of a speech received (input) using a speech recognition algorithm, within the database. Afterwards, a function corresponding to the voice command is executed based upon the analyzed meaning and context. This function may involve, for example, information search. The first speech recognition mode and the second speech recognition mode work in the same way until this process, but produce different results from the execution of this function.

For example, when the user asks about customer service centers, the first speech recognition mode and the second speech recognition mode produce different results. In a more concrete example, referring to FIG. 7A, the second speech recognition mode is executed by touching or pushing the home key (not shown) on the terminal in a preset pattern.

When the user enters a voice command "Where's the closet LG customer service?", in the second speech recognition mode as a way of asking about customer service centers, a list of customer service centers close to the terminal's location is displayed on the touchscreen 351 as a second processing result 369b of the voice command. In this way, the second processing result 369b for the second speech recognition mode may be displayed through the touchscreen 351. The second processing result 369b may be output in audio format based on a setting preset by the user or a request of the user for this option.

On the contrary, referring to FIG. 7B, when the user enters the same voice command (or a voice command with the same meaning) "Where's the closet LG customer service?" as a way of asking about customer service centers, while the first speech recognition mode is on, a first processing result 369a of the voice command may be output to deal with any possible abnormal state of the touchscreen.

More specifically, as shown in the third image of FIG. 7B, when the user asks about customer service centers in the first speech recognition mode, the user may be directed to the closets customer service center, based on the current location. In this case, the closest customer service center is detected based on the current location of the terminal and the locations of found customer service centers.

The first processing result 369a includes basic information such as phone number, address, business hour, etc. The information may be output in audio format through the audio output parts on the main body. In this way, the first processing result 369a for the first speech recognition mode may be output in audio format, in which case the processing result may be displayed on the touchscreen 351.

Meanwhile, if location information cannot be retrieved when the user asks about customer service centers, the closest customer service center cannot be detected. In this case, as shown in FIG. 7B, the user may be directed to the main phone number for the customer service centers.

As explained above, in the second speech recognition mode, a list of customer service centers' information found when the user asks about customer service centers is output as the second processing result 369b, whereas, in the first speech recognition mode, the first processing result 369a is output to deal with any possible abnormal state of the touchscreen, like directing the user to the closest customer service center.

Moreover, another function may be implemented in the first speech recognition mode. Hereinafter, the first speech recognition mode will be referred to as the speech recognition mode for convenience of explanation.

FIGS. 8A and 8B are conceptual diagrams for explaining another example of speech recognition mode control in a mobile terminal according to the present invention.

As shown in the drawings, a voice input function may be activated or deactivated on the speech recognition mode execution screen, depending on whether a voice command is entered by the user or not. Activating the voice input function may involve driving the speech recognition engine and displaying the icon 355 indicating that speech recognition is on, while the microphone 222 is activated to receive the user's speech. The voice input function may be activated or deactivated, along with the displaying of examples that prompt the user to enter a voice command.

Referring to FIG. 8A, voice command examples 354 may be displayed on the speech recognition mode execution screen. These examples may include "Where's the closest LG customer service?", "Call John", "I want to answer the phone", "Read my new messages", or "Turn off all alarms", and may be spoken in audio format using the audio output parts 252 and 252' on the terminal. In this case, the voice input function may be activated.

The voice input function may be repeatedly activated and deactivated. If the user's speech is not entered while the voice input function is repeated a preset number of times, the voice input function remains inactive. In another example, when the voice input function is active, if the user's voice is not entered while the above examples are displayed a preset number of times, the voice input function may be deactivated, and remain inactive.

While the voice input function remains inactive, a new voice command example 371 that prompts the user to speak a voice command are added, as shown in the second image of FIG. 8A. This example may include such a phrase as "Say 'LG Mobile' to smart a voice command" that may be displayed on the touchscreen and output in audio format. The new example 371 prompting the user to speak may keep appearing until a voice command is recognized. Afterwards, when a speech requesting the execution of a particular function, like "Call John", is entered, the corresponding function may be executed.

Meanwhile, the voice input function also may be deactivated when the speech recognition mode is executed and there is no voice input from the user in the process of entering a speech requesting the execution of a particular function.

Referring to FIG. 8B, when the user is directed to the closest customer service center, as shown in the third image of FIG. 7B, by entering an inquiry about customer service centers while the speech recognition mode is on, the terminal may ask the user a question 372 on if they want to call the customer service center to which the user is directed. If the user's speech is not entered a preset number of times, the voice input function is deactivated and turned off. If the terminal cannot recognize the user's speech, even if there is any, it may be decided that there is no voice input.

If the user's speech is not entered a preset number of times during the execution of a particular function, a new example 373 prompting the user to speak a voice command may be added. For example, such a phrase as "Please speak again" may be added and displayed on the touchscreen 351 and output in audio format. This phrase may be repeatedly displayed and output. If the user's speech is no longer input, a phrase that the execution of the particular function is finished may be additionally displayed on the touchscreen and output in audio format. In this case, when the user enters a voice command that they want to call the customer service center to which the user is directed, a call is made to the customer service center.

On the contrary, if no voice input is entered any longer and the voice input function is deactivated and turned off, an example prompting the user to speak a voice command to re-execute the particular function may be displayed on the touchscreen and output in audio format. The example prompting the user to speak may keep appearing until the voice command is recognized.

As above, if there is no voice command input from the user in the speech recognition mode, a phrase prompting the user to speak a voice command may be output, and the phrase may be displayed on the touchscreen and disappear when the voice command is recognized. More specifically, when a voice command corresponding to the new example is entered by the user, this example may disappear, and the information that was displayed before completion of the execution of the particular function may be displayed again on the touchscreen. In this case, the speech recognition function may be activated again, and the terminal may receive a user command such as making a call to the customer service center to which the user is directed and execute the user command.

The control method associated with the turn on/off of the speech recognition function has been described above. In the speech recognition mode of the present invention, various functions may be additionally executed. Hereinafter, these functions will be described in more detail with reference to FIGS. 9A and 9B, FIGS. 10A and 10B, FIGS. 11A and 11B, and FIG. 12.

FIGS. 9A and 9B and FIGS. 10A and 10B are conceptual diagrams for explaining the Call saved contacts function and Receive calls function in the speech recognition mode according to the present invention.

Referring to FIG. 9A, the Call saved contacts function may be provided. The Call saved contacts function may be available only to the numbers saved in contacts.

For example, the controller may check whether the destination number is included in saved contacts, upon receiving a request from the user to make a call in the speech recognition mode, and if not, may not send a call signal to the called party number. If the destination number is included in the saved contacts, a confirmation screen 374 may show up so that the user can make sure they want to make a call to the destination number.

The confirmation screen 374 may present information on the destination number and keys for finally selecting to make a call. When the user finally confirms using the keys or a voice command that they want to make a call, a call signal is sent.

In this case, as shown in FIG. 9B, if a phone number to be called is entered by voice and the phone number is included in the contacts, the controller may output a guide 375 that asks the user to provide other information associated with the phone number. More specifically, as shown in the drawing, if there is a request to make a call to an unsaved phone number (e.g., 010-3456-7890), no call signal is sent to the phone number, but instead a guide 375 asking for a name associated with the phone number is output. The guide 375 is a phrase that asks for a name, like "Say a name saved in contacts", which may be displayed on the touchscreen 351 and output in audio format.

When the user enters information such as a name by voice, the controller finds out whether the information is included in the saved contacts, and if so, inquires whether the user wants to send a call signal. As stated above with reference to FIG. 9B, the inquiry may be made through the confirmation screen 374.

By the way, if there is a different person of the same name or multiple numbers belong to the same person, doing more search, making suggestions to the user, and displaying saved phone numbers may be restricted. In this case, if the information entered by voice by the user is not included in the saved contacts, the guide asking for information associated with the phone number may show up again.

Meanwhile, a Receive calls functions shown in FIGS. 10A and 10B may be performed by a different process according to the user's settings. FIG. 10A illustrates that an option of asking whether to answer an incoming call is on in the Call settings, and FIG. 10B illustrates that this option is off.

First of all, as shown in FIG. 10A, voice command examples 354 may be displayed on the touchscreen 351 as a speech recognition mode execution screen. If the user enters, by voice, an inquiry as to receiving calls, the terminal recognizes this inquiry. If the option of asking whether to answer an incoming call is on, for example, the Answer an incoming call option is on, the user is taken to the corresponding function.

More specifically, the terminal provides a function of receiving calls by sensing a motion, and in the speech recognition mode, gives guidance about this motion, in response to the user's inquiry. The guidance 375 about this motion may be output in audio format, and displayed in text or image on the touchscreen. For example, if the user brings the terminal to the ear to receive an incoming call, the terminal may sense this motion and answer the incoming call. In this case, upon receiving an inquiry from the user, the terminal may inform the user of information that the user can receive the call by bringing the phone to the ear. When there is an incoming call later, the user may receive the call by making a motion of bringing the phone to the ear.

In this case, if the option of asking whether to answer an incoming call is off, the terminal gives guidance about the corresponding function and asks the user whether to activate this function, as shown in FIG. 10B. For example, if the user enters, by voice, an inquiry as to receiving calls, the terminal recognizes this inquiry. The terminal provides a function of receiving calls by sensing a motion, and in the speech recognition mode, gives guidance about receiving calls by making this motion, in response to the user's inquiry. Following the guidance, the terminal asks 376 the user in audio format whether to activate this function. This question also may be displayed in text on the touchscreen 351. If the user enters a command to activate this function later, the controller activates the function of receiving calls by making this motion. Also, the controller activates this function in the menu status of the Call settings as well.

Next, the Read messages function for reading out messages will be described with reference to FIGS. 11A and 11B. FIGS. 11A and 11B are conceptual diagrams for explaining the Read messages function in the speech recognition mode according to the present invention.

Referring to FIG. 11A, when the user makes a request to read messages in the speech recognition mode, the terminal outputs the content of the messages in audio format, along with the sender of the messages. The content of the messages may be displayed in text or image on the touchscreen 351. The Read messages function may be available only to new messages. After the content of the messages is displayed, the notification informing the receipt of messages disappears from the messaging application, and the read-once messages are no longer read when news messages are read later. Further, this function may be set not to send a reply or message.

In a more concrete example, first of all, voice command examples 354 may be displayed on the touchscreen 351 as a speech recognition mode execution screen, as shown in the drawings. In this case, when the user makes a voice request to read messages, like saying "Read my new messages", a Read messages function execution screen 376 may be displayed on the touchscreen 351. The content of the messages, along with the sender of the messages, is displayed on the execution screen 367, and the terminal outputs the content of the messages and the sender information in audio format. Also, as shown in the drawing, the terminal may output the number of new messages in audio format and inform the user of this. Afterwards, when the user enters a voice request to read the next message, like saying "Next", the content of the next message may be displayed on the execution screen.

In this case, upon receiving a request to perform the Read messages function, the controller may ask the user to provide authentication information. Similarly to the above-described Call function, the authentication information may be requested in a case where the lock function is enabled in the terminal. Also, asking for authentication information may be disabled in a separate setting. Once the asking for authentication information is disabled, the Read messages function may be performed without authentication upon a request from the user, while the terminal is locked.

For example, referring to FIG. 11B, when the user enters a voice request to read messages while the speech recognition mode is on, the terminal asks the user to provide authentication information. The authentication information may be a PIN number or password, for example. The PIN number may be a number set by the user, and the password may be the last four digits of the user's phone number.

In an example of asking for authentication information as the PIN number, a guidance phrase (or information) 377 that guides the input of authentication information such as "To hear your messages, say the last 4 digits of your phone number" may be displayed on the touchscreen 351, and the guidance phrase 377 may be output in audio format. In this case, the speech recognition mode execution screen may keep appearing on the touchscreen. Afterwards, a process of executing the Read messages function by an authentication procedure may be performed in the same way as the authentication for making calls explained with reference to FIGS. 5B, 5C, and 5D. Accordingly, a description of this can be substituted with the description of the above-described authentication for making calls.

The speech recognition mode of the present invention offers functions associated with alarm control. For example, a Turn off alarms function will be described with reference to FIG. 12.

FIG. 12 is a conceptual diagram for explaining the Turn off alarms function in the speech recognition mode according to the present invention.

As shown in the drawing, the speech recognition mode of the present invention may offer control functions associated with the turn on/off of alarms. If the user has multiple alarms set on the terminal, the alarms may be turned off altogether when the user enters a voice command to turn off the alarms in the speech recognition mode.

For example, when the speech recognition mode is executed, voice command examples 354 may be displayed on the touchscreen as the speech recognition mode execution screen. These examples may include "Where's the closest LG customer service?", "Call John", "I want to answer the phone", or "Read my new messages", and may be spoken in audio format using the audio output parts 252 and 252' on the terminal. In this case, the voice command examples may include commands associated with the turn on/off of alarms, like "Turn off all alarms". Also, when the speech recognition mode is executed, the voice input function may be activated, along with the displaying of these examples.

As shown in the drawing, when the user enters a voice request to turn off alarms, the alarms set on the terminal may be turned off. In this case, the turn off of alarms may be available only to the function of turning off all the alarms set on the terminal. Also, information 378 associated with set alarms, for example, alarm times, may be displayed on the touchscreen, along with the turn off of alarms.

Various functions for the speech recognition mode have been described above. Meanwhile, the speech recognition mode may be finished upon receiving a given input, or the user may select whether to enable the speech recognition mode or not.

Hereinafter, the settings for finishing or enabling the speech recognition mode will be described with reference to FIGS. 13 and 14.

FIG. 13 is a conceptual diagram for explaining a control method for finishing the speech recognition mode in a mobile terminal according to the present invention. FIG. 14 is a conceptual diagram for explaining a control method when the speech recognition mode is not enabled yet on a mobile terminal according to the present invention.

Referring to these drawings, if the push key 323 (see FIG. 4) is pushed while the speech recognition mode is on, the speech recognition mode may be finished, and the virtual keys 352a may be displayed again on the touchscreen 351. The push key 323 may be a power key that is long-pressed when the virtual keys 352a are displayed for the first time on the touchscreen 351.

Also, if the push key 323 is pushed before the elapse of a standby time (the above-mentioned first period of time) during which guidance information on the speech recognition mode is output while the virtual keys 352a are displayed, the virtual keys 352a associated with the power control of the terminal may disappear.

More specifically, when the speech recognition mode is executed, voice command examples 354 may be displayed on the touchscreen 351 as a speech recognition mode execution screen. These examples may be spoken in audio format using the audio output parts 252 and 252' on the terminal. Also, when the speech recognition mode is executed, the voice input function may be activated, along with the displaying of these examples.

As shown in the second image of FIG. 13, if the push key 323 is long-pressed while the speech recognition mode is on, the power control window 352 may appear again on the touchscreen 351. In this case, the speech recognition mode is finished. Also, the virtual keys 352a associated with the power control of the terminal may be provided at the power control window 352. Also, the power control window 352 may pop up on the touchscreen 351.

Afterwards, if a set period of time elapses without at least one touch input on the virtual keys 352a being sensed, functions associated with the speech recognition mode are executed. However, if the push key is pushed before the elapse of the set period of time, the touchscreen 351 may be deactivated.

In another example, if the push key 323 is pushed before the elapse of the set period of time, the previous screen that has been displayed before the execution of the speech recognition mode may appear again on the touchscreen 351. If the terminal is in the locked state, the lock screen may appear as the previous screen, as shown in FIG. 13.

In this way, when the speech recognition mode is executed by the method of the example given with reference to FIGS. 4A, 4B, and 4C after the speech recognition mode is finished, the voice command examples displayed on the touchscreen as the speech recognition mode execution screen may be changed. For example, examples of the functions used in the previously executed speech recognition mode may be omitted or replaced with brief information.

Referring to FIG. 14, if the push key 323 is pushed, the power control window 352 associated with the power control of the terminal may appear on the touchscreen 351. In this case, if a certain period of time elapses without any touch input on the power control window 352 being sensed, guidance information 353 for the speech recognition mode may be output. Afterwards, the speech recognition mode may be set not to be automatically executed even after the elapse of another certain period of time. That is, the guidance information may include an execution method of the speech recognition mode. For example, the user may be asked to press the push key (e.g. power key) or other push keys (volume key and home key). Also, the requested information 379 may be output on the touchscreen, along with the guidance information 353.

Afterwards, if at least one among the power key, volume key, and home key is pushed, the speech recognition mode may be executed. The example shown in FIG. 14 may be applicable when there is no agreement on terms and conditions of the voice care function.

More specifically, Voice Care Guide and a notification of the terms and conditions may be provided immediately after the terminal is booted for the first time. By tapping or touching the notification, pop-ups associated with the Voice Care Guide and the terms and conditions may appear on the touchscreen, and if the user chooses to agree or disagree, the terminal may go back to the previous screen.

If the user disagrees, the agreement screen may appear again when the speech recognition mode is executed. In this case, after the execution of the speech recognition mode, the user cannot proceed to the next screen if they disagree, and the user has to agree to execute the next function. Also, an agreement on the terms and conditions may be withdrawn or canceled. In this way, the user may select whether to execute the speech recognition mode with the voice care function.

If the agreement on the terms and conditions is withdrawn or the user disagrees, the speech recognition mode may be executed by the execution method of FIG. 14. In this way, the execution process of the speech recognition mode may differ depending on whether the user agrees or disagrees with the terms and conditions of the voice care function.

Although the speech recognition mode with the voice care function has been described above, the method of detecting a failure of the touchscreen and the method of providing a solution to a failure may be modified in various ways.

Hereinafter, another method of providing a solution will be described in more detail with reference to FIGS. 15 to 17B.

FIG. 15 is a flowchart representing a control method for a terminal according to another embodiment of the present invention. FIG. 16 is a conceptual diagram showing the touchscreen being partially driven by the control method of FIG. 15.

According to the control method, first of all, an abnormal state of the touchscreen 451 (see FIG. 17A) may be detected at step S210.

Examples of the abnormal state of the touchscreen 451 may include a malfunction of touch input sensing on the touchscreen 451, a damage to the liquid crystals (display part) of the touchscreen 451, a damage to the window of the touchscreen 451, and so on.

The abnormal state may be detected by a detector (not shown). The detector may detect an abnormal state of the touchscreen 451 by sensing an impact or acceleration on the terminal or sensing information associated with the amount of electric current for controlling the touchscreen 451.

To detect an abnormal state by sensing an impact on the terminal or to regard a state that the impact on the terminal is sensed as the abnormal state, an impact sensor is provided on the terminal. If the amount of an impact sensed by the impact sensor is above a preset level, it may be decided that an abnormal state such as a damage to the liquid crystals of the touchscreen 451 has occurred.

In another example, an acceleration sensor may be provided at the terminal. If an acceleration sensed by the acceleration sensor corresponds to a specific pattern or is out of a preset pattern, it may be decided that an abnormal state such as a damage to the liquid crystals of the touchscreen 451 has occurred. In yet another example, an abnormal state of the touchscreen 451 may be sensed.

As a method of sensing an abnormal state of the touchscreen 451, changes in electric current detected by a touch sensor may be used. For example, if the amount of electric current applied to control the touch sensor becomes different from those in normal state, this may be regraded that touch sensing does not work on the touchscreen 451.

The touch sensor of the touchscreen 451 is capable of sensing a touch on the display device by using at least one of many touch sensing methods: resistive sensing, capacitive sensing, infrared sensing, ultrasonic sensing, magnetic field sensing, etc. A touch sensor that senses a touch by capacitive sensing may be configured to convert a change in pressure on a specific region or a change in capacitance at a specific region of the touchscreen 451 into an electric input signal.

For example, X and Y electrodes of the touch sensor are arranged in a direction crossing each other, and supplied with electric charge from a power supply part (not shown). Accordingly, when the user's finger or the like touches the touchscreen 451 while there is a potential difference between the X and Y electrodes. Accordingly, the X and Y electrodes become driven for touch sensing when supplied with electric current caused by the potential difference, and the amount of electric current changes due to the user's touch. The controller may calculate the positions of X and Y axes where a touch is applied, based on the amount of electric current, and specify a touch input point based on the calculated values. The X electrodes and the Y electrodes may be composed of a plurality of lines, and a preset amount of potential difference may be formed on each line. In this specification, the X electrodes and the Y electrodes are not terms with general meanings, but are relative terms. Therefore, it is not necessary for the X electrodes and the Y electrodes to correspond to the X-axis direction and the Y-axis direction, respectively. That is, if either the X electrodes or the Y electrodes correspond to the X-axis direction, the other type of electrodes may correspond to the Y-axis direction.

In the above-explained capacitive touch sensor, if the amount of electric current applied to sense a touch is different from those in normal state, it may be recognized that touch sensing does not work on the touchscreen 451.

In another example, if the amount of electric charge measured at a touch point is different from those measured in normal state by a preset amount or greater, it may be recognized that the touchscreen 451 is in an abnormal state.

As seen above, in this example, the terminal may sense an abnormal state of the touchscreen 451 directly through a detector (not shown) for detecting an abnormal state of the touchscreen, unlike the foregoing example.

Next, if an abnormal state is detected, guidance information at least one function that allows for control of the terminal in the abnormal state is output through at least either the audio output parts 252 and 252' or the touchscreen 451 at step S220. Also, the corresponding function may be executed after the guidance information is output at step S230.

For example, if an abnormal state is detected, the controller may output guidance information associated with a speech recognition mode and receive the user's input about whether to execute the speech recognition mode. The guidance information may be the same information as the guidance information that has been described in the example of a speech recognition mode with the voice care function explained with reference to FIGS. 3 to 14. Accordingly, the outputting of guidance information when the push key is pushed in the previous description may be substituted with the outputting of guidance information associated with the speech recognition mode when the abnormal state is detected. That is, the control method described with reference to FIGS. 3 to 14 may be all applicable to the control method associated with the speech recognition mode after the output of guidance information in this example, a description of which will be substituted with the foregoing description.

Meanwhile, if an abnormal state is detected, the controller may output guidance information 481 (see FIG. 17A) associated with a change of a driving method of the touchscreen 451 and receive the user's input about whether to change the driving method. In this case, the touchscreen may be divided into a plurality of areas, and upon detecting an abnormal state in some of these areas, the controller may control the touchscreen to display in the remaining area, apart from the area where the abnormal state is detected. In another example, display may be available across all of the plurality of areas, but touch sensing may not be available in some area.

More specifically, referring to FIG. 16, the crossings of the X and Y electrodes of the touch sensor may be grouped as a plurality of areas 451a and 451b. In this case, if an abnormal state is detected in a particular area 451b, the controller drives the touchscreen 451 in the remaining area apart from the particular area 451b. That is, the controller applies a driving current not to the lines of the X electrodes running across the particular area 451b, but only to the other electrodes.

In this case, the method of providing a solution to the abnormal state of the touchscreen 451 may be partial driving of the touchscreen 451. The method of driving only a part of the touchscreen 451 may be used together with the above-described speech recognition mode with voice care. For example the terminal may be configured in such a manner that the user can select between partial driving of the touchscreen and the speech recognition mode with voice care.

As above, partial driving of the touchscreen 451 may apply in various ways. Hereinafter, such application examples will be described in more detail with reference to FIGS. 17A and 17B.

FIGS. 17A and 17B are conceptual diagrams for explaining an example of controlling the touchscreen to be partially driven in a mobile terminal according to the present invention.

Referring to FIG. 17A, an abnormal state occurs to the touchscreen 451 of the terminal. For example, a specific portion of the window of the touchscreen 451 may be damaged. Such an abnormal state may be detected by the detector mentioned with respect to the control method given with reference to FIGS. 15 and 16.

If the touchscreen 451 is in an abnormal state, when the user enters a control command to activate the touchscreen, guidance information 481 associated with a care function may be displayed on the touchscreen before the lock screen appears. The guidance information 481 may be information asking the user whether to execute the care function, like "Do you want to execute care function?". Also, as shown in the second image of FIG. 17A, virtual keys for selecting whether to execute the care function may be output on the touchscreen 451, along with the guidance information 481.

If the user selects to execute the care function, then the lock screen may appear. In this case, the lock screen may be divided into a type used when the care function is not executed and another type. For example, the detector may detect a portion of the touchscreen 451 where an abnormal state has occurred, and the controller may drive the other area 451a, apart from the area including this portion. Accordingly, the lock screen appearing on the touchscreen 451 may be displayed in the driving area, apart from the non-driving area 451b.

Moreover, when the lock screen is unlocked and the home screen page appears on the touchscreen, the home screen page may be displayed in the driving area 451a, apart from the non-driving area 451b where the touchscreen 451 is not driven. Also, a control operation of sensing a touch on the touchscreen may be performed only in the driving area 451a apart from the non-driving area 451b. More concretely, as described above, the electrode lines corresponding to the non-driving area 451b may be controlled not to sense a touch.

The partial driving of the touchscreen 451 may be done also when the terminal executes a particular function. As shown in FIG. 17b, for example, if an abnormal state such as a damage to the touchscreen occurs while the home screen page is displayed on the touchscreen, the detector may detect this and display guidance information associated with the care function on the touchscreen 451. The guidance information 481 may be information asking the user whether to execute the care function, like "Do you want to execute the care function?". If the user selects to execute the care function, a selection screen 451c for selecting a desired area from among a plurality of areas of the touchscreen 451 may appear, as shown in the third image of FIG. 17B. The selection screen 451c is information that is output by separating the touchscreen into a plurality of areas. The user may select an area that they want to execute by touching that area.

Once the user selects an area that they want it to be driven, the controller drives the touchscreen in the area 451a selected by the user. Accordingly the size of the home screen page may be scaled down and shifted to the user-selected area and output, as shown in the last image of FIG. 17B.

As explained above, an abnormal state of the touchscreen may be recognized by a process of sensing a malfunction of the terminal. In this case, user convenience can be improved because a solution is provided to the user to deal with the abnormal state of the touchscreen.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The invention claimed is:

1. A mobile terminal comprising:
a touchscreen disposed on one side of a main body of the terminal;
a push key mounted on the main body to receive a push input;
an audio output unit disposed on the main body; and
a controller that:
causes the touchscreen to display virtual keys associated with settings or control of the terminal in response to the push input received on the push key;
executes functions associated with a speech recognition mode when a set period of time elapses without receiving at least one touch input on the virtual keys by:

causing the audio output unit to output guidance information for the speech recognition mode after a first period of time elapses without receiving a touch input on the virtual keys; and executing the speech recognition mode after a second period of time elapses after the guidance information is output;

deactivates the touchscreen when the speech recognition mode is executed; and terminates the speech recognition mode and causes the touchscreen to re-display the virtual keys in response to a push input received on the push key while the speech recognition mode is executed.

2. The mobile terminal of claim 1, wherein the controller causes the touchscreen to stop displaying the virtual keys in response to a push input received on the push key prior to an elapse of the first period of time.

3. The mobile terminal of claim 1, wherein the speech recognition mode comprises first and second speech recognition modes in which different processing results are output for a same voice command entered through a microphone on the main body, and wherein the controller executes the first speech recognition mode in response to a command after the set period of time elapses without receiving at least one touch input on the virtual keys.

4. The mobile terminal of claim 3, wherein the controller executes the second speech recognition mode in response to touching or pushing a home key on the terminal in a preset pattern.

5. The mobile terminal of claim 3, wherein a processing result for the first speech recognition mode is output through the audio output unit, and a processing result for the second speech recognition mode is output through the touchscreen.

6. The mobile terminal of claim 3, wherein the first speech recognition mode is executed according to a selection by a user.

7. The mobile terminal of claim 1, wherein the controller asks for authentication information upon receiving a user request to execute a particular function in the speech recognition mode.

8. The mobile terminal of claim 7, wherein the authentication information is requested in a case when a lock function is enabled in the terminal.

9. The mobile terminal of claim 7, wherein the authentication information is not requested when the authentication information request is disabled in speech recognition mode settings.

10. The mobile terminal of claim 9, wherein the particular function comprises at least either a Call function or a Read messages function, and wherein once the authentication information request is disabled, at least either the Call function or the Read messages function is executed without asking for the authentication information upon receiving the user request while the terminal is locked.

11. The mobile terminal of claim 1, wherein the controller checks whether a destination number is included in saved contacts, upon receiving a user request for making a call in the speech recognition mode.

12. The mobile terminal of claim 11, wherein the controller outputs a guide requesting other information associated with a phone number in response to a voice input including the phone number to call, the phone number included in the saved contacts.

13. The mobile terminal of claim 1, wherein the speech recognition mode is executed after the set period of time elapses without receiving at least one touch input on the virtual keys, and wherein a phrase prompting a user to speak a voice command is output when no voice command is received from the user in the speech recognition mode.

14. The mobile terminal of claim 13, wherein the phrase is displayed on the touchscreen and disappears when a voice command received from the user is recognized.

15. The mobile terminal of claim 1, wherein the speech recognition mode is executed after the set period of time elapses without receiving at least one touch input on the virtual keys, and wherein the speech recognition mode offers control functions associated with turning on/off alarms.

16. The mobile terminal of claim 15, wherein multiple alarms set on the terminal are turned off altogether when a voice command for turning off the alarms is received from the user in the speech recognition mode.

* * * * *